US006850634B1

(12) United States Patent
Shinbata

(10) Patent No.: US 6,850,634 B1
(45) Date of Patent: Feb. 1, 2005

(54) IMAGE PROCESSING APPARATUS, METHOD, AND STORAGE MEDIUM FOR PROCESSING A RADIATION IMAGE

(75) Inventor: Hiroyuki Shinbata, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/405,175

(22) Filed: Sep. 24, 1999

(30) Foreign Application Priority Data

Sep. 25, 1998 (JP) ............................................ 10-272284
Sep. 17, 1999 (JP) ............................................ 11-264448

(51) Int. Cl.[7] ................................................. G06K 9/00
(52) U.S. Cl. ...................... 382/132; 382/199; 382/203; 382/206; 382/274; 358/521
(58) Field of Search ................. 382/128–132, 382/199, 203, 263, 266, 274, 190; 358/521; 250/456

(56) References Cited

U.S. PATENT DOCUMENTS

| 4,183,013 | A | * | 1/1980 | Agrawala et al. ........... 382/173 |
| 5,091,967 | A | * | 2/1992 | Ohsawa ...................... 382/172 |
| 5,151,947 | A | * | 9/1992 | Nagatsuka et al. ......... 382/132 |
| 5,345,513 | A | * | 9/1994 | Takeda et al. .............. 382/132 |
| 5,680,471 | A | * | 10/1997 | Kanebako et al. .......... 382/128 |
| 5,732,149 | A | * | 3/1998 | Kido et al. ............... 250/492.1 |
| 6,035,064 | A | * | 3/2000 | Nakao et al. ............... 382/174 |
| 6,055,326 | A | * | 4/2000 | Chang et al. .............. 382/132 |
| 6,335,980 | B1 | * | 1/2002 | Armato et al. ............. 382/132 |

OTHER PUBLICATIONS

U.S. Appl. No. 09/287,406.*

* cited by examiner

Primary Examiner—Jon Chang
Assistant Examiner—Charles Kim
(74) Attorney, Agent, or Firm—Fitzpatrick, Cella, Harper & Scinto

(57) ABSTRACT

An image processing method for extracting a characteristic amount of a photographed image from the photographed image obtained by photographing an object, comprises a passing through deleting step of deleting a passing through area from said photographed image, a preparing step of preparing an outside outline of the object from the image from which the passing through area is deleted, and a setting step of setting an area from which the characteristic amount is to be extracted from a shape of the outside outline.

16 Claims, 21 Drawing Sheets

IMAGE PROCESSING APPARATUS, METHOD, AND STORAGE MEDIUM FOR PROCESSING A RADIATION IMAGE

BACKGROUND OF THE INVENTION

1. Field of the Invention

The present invention relates to a constitution which performs a processing of an image for medical purposes.

2. Related Background Art

In recent years, with the advancement in digital techniques, there has been performed a processing, for example, which comprises: receiving radiation (X rays, and the like) by a sensor via an object; digitizing a resulting radiation image; performing a predetermined image processing on a digital image; and transmitting an output to a monitor, or a film for X-ray diagnosis.

Examples of the image processing include a gradation conversion processing in which gradation conversion is performed in accordance with density distribution of an original image obtained by radiographing. By the gradation conversion processing, the image obtained by the radiographing is converted to a density value which is easily observed, and outputs are transmitted to the monitor, the film, and the like.

For example, FIG. 27 shows an X-ray image 600 which is obtained by X-ray photographing of a cervical vertebra front part. In FIG. 27, an area 601 (black portion) shows a head part, and the other area 602 shows a throat part.

Here, when the X-ray image 600 is outputted to the film for X-ray diagnosis, first, a characteristic amount of the X-ray image 600 is extracted. In this case, in a method of extracting the characteristic amount, as shown in FIG. 28, used is a histogram of a remaining area which is obtained by deleting a passing through area (area in which X rays are directly radiated to the sensor) from the X-ray image 600. In FIG. 28, abscissa shows pixel value, and ordinate shows output frequency. Therefore, in the histogram, the pixel value (x) of a lower portion, for example, a constant portion (low density portion) point such as 5% point is extracted as the characteristic amount, and the density value of the X-ray image 600 is converted so that the extracted pixel value (x) reaches a density value of about 1.0 on the film.

However, in the above-described conventional characteristic amount extracting method, the pixel value around the low density portion at most is merely extracted as the characteristic amount for use in the gradation conversion processing. Specifically, the portion from which the characteristic amount is extracted is not necessarily stable. Therefore, when the characteristic amount obtained in the conventional method is used to perform the gradation conversion processing on the photographed image, there arises a problem that the density value is dispersed in the film or the like for each photographed image. This deteriorates the image quality of the processed image.

SUMMARY OF THE INVENTION

An object of the present invention is that a characteristic area of photographed image can highly precisely be set.

To attain this object, according to the present invention, there is provided an image processing method for extracting a characteristic amount of a photographed image from the photographed image obtained by photographing an object, comprising:

a passing through deleting step of deleting a passing through area from the photographed image;

a preparing step of preparing an outside outline of the object from the image from which the passing through area is deleted; and a setting step of setting an area to extract the characteristic amount therefrom from a shape of the outside outline.

There is also provided an image processing method for extracting a characteristic amount of a photographed image from the photographed image obtained by photographing an object, comprising:

a preparing step of preparing an outside outline of the object;

a setting step of setting a characteristic area in the photographed image in accordance with a curvature in each point of the outside outline; and an extracting step of extracting the characteristic amount based on the characteristic area.

Another object of the present invention is to realize an excellent gradation conversion.

To attain the object, the image processing method of the present invention further comprises a gradation conversion processing step of performing a gradation conversion processing based on the characteristic amount.

Further object of the present invention is to excellently judge a posture of a photographed image.

To attain the object, according to the present invention, there is provided an image processing method for extracting a characteristic amount of a photographed image from the photographed image obtained by photographing an object, comprising:

a preparing step of preparing an outside outline of the object; and a judging step of judging a posture of said photographed image based on a shape of the outside outline.

The present invention will be illustrated hereinafter by way of example, and not by way of limitation.

DETAILED DESCRIPTION OF THE PREFERRED EMBODIMENTS

Embodiments of the present invention will be described hereinafter with reference to the drawings.

(First Embodiment)

Figure 1:
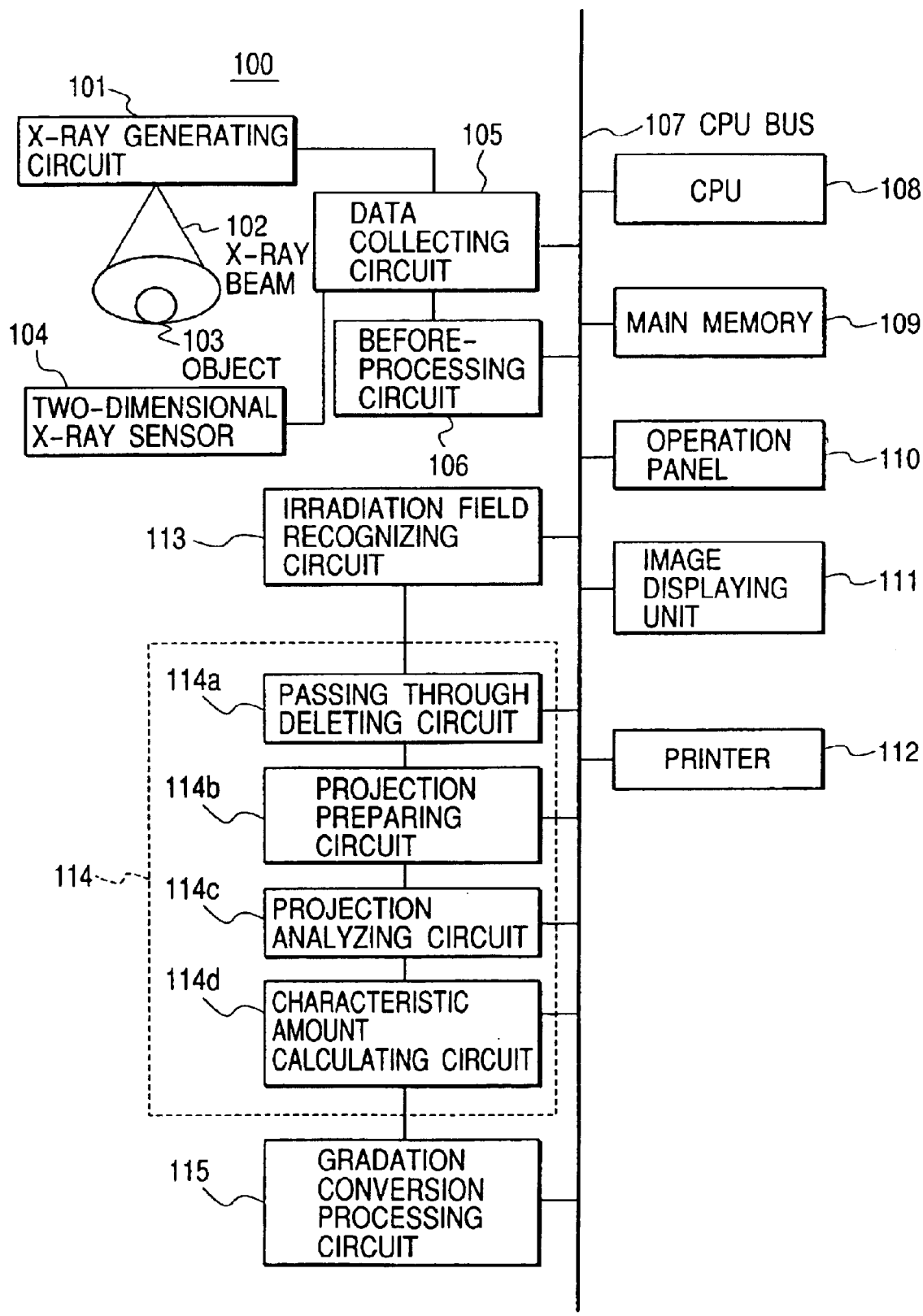
FIG. 1 is a block diagram showing one constitution example of an X-ray photographing device.

The present invention is applied, for example, to an image processing device 100 as shown in FIG. 1.

The image processing device 100 is an X-ray image processing device having a gradation conversion processing function (density value converting function), and is provided, as shown in FIG. 1, with a data collecting circuit 105, a before-processing circuit 106, an irradiation field recognizing circuit 113, a characteristic amount extracting circuit 114, a gradation conversion processing circuit 115, a CPU 108, a main memory 109, an operation panel 110, an image displaying unit 111, and a printer 112. These constituting components exchange data via a CPU bus 107.

Moreover, the image processing device 100 is provided with an X-ray generating circuit 101 and a two-dimensional X-ray sensor 104. Additionally, the X-ray generating circuit 101 and two-dimensional X-ray sensor 104 are connected to the data collecting circuit 105, and an X-ray beam 102 radiated from the X-ray generating circuit 101 is incident upon the two-dimensional X-ray sensor 104 via an object to be tested (object) 103.

Figure 3:
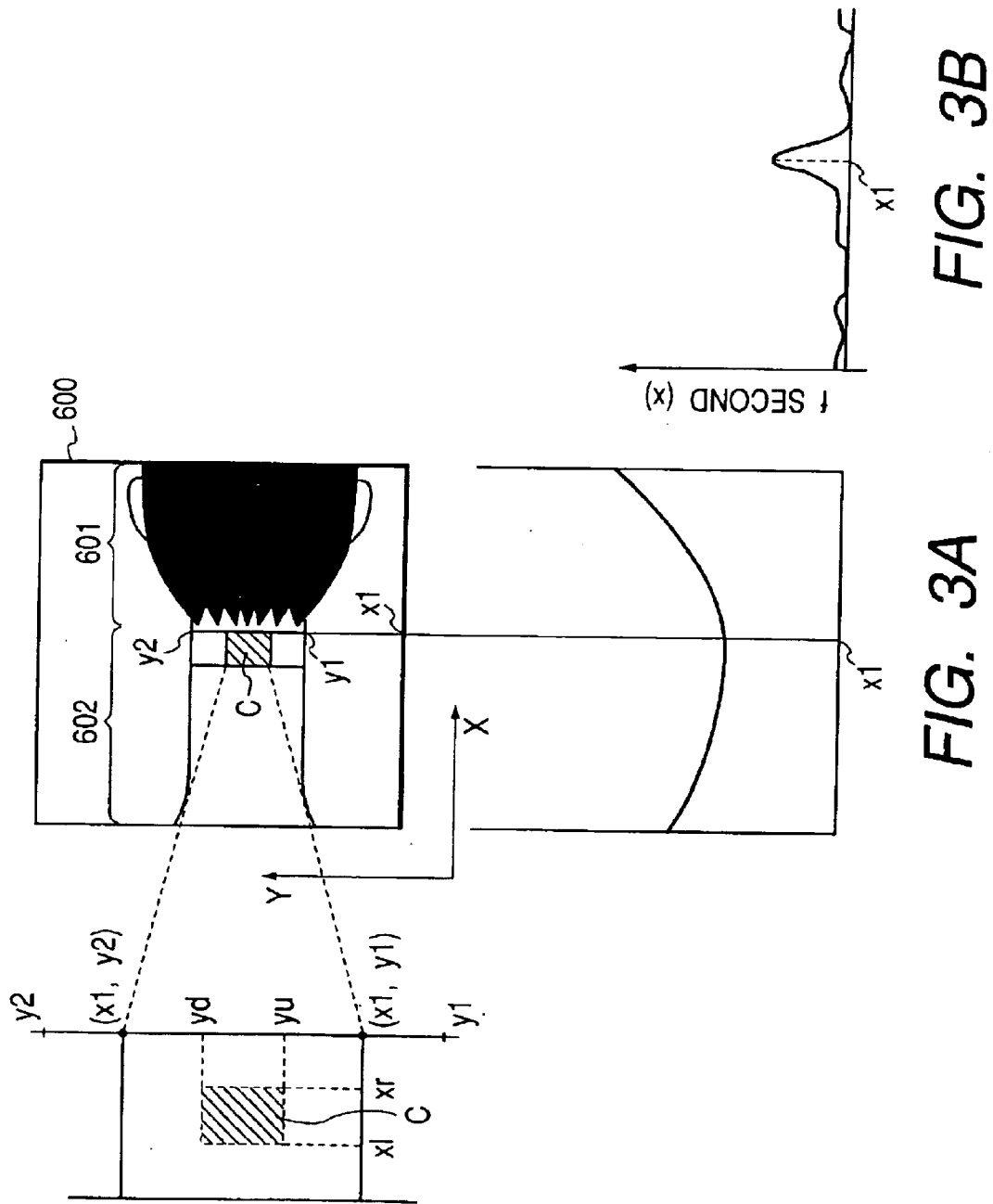
FIGS. 3A and 3B are explanatory views of a projection obtained in the characteristic amount extracting circuit.

Here, in the embodiment, a cervical vertebra front part is X-ray photographed by the image processing device 100 to obtain an image 600 as shown in FIG. 3, and the characteristic amount of the image 600 is extracted. For example, as an area from which the characteristic amount is to be extracted, the vicinity of a bone area of a throat 602 is used, and the pixel value of the area is extracted as the characteristic amount (density characteristic amount). This is because it has been experimentally found that when the pixel value of the vicinity of the bone area of throat 602 is used as the characteristic amount to perform a gradation conversion processing, a stable gradation characteristic can be obtained.

Additionally, since an area 601 (black portion) is inferior in X-ray transmittance, obtained data has a lower pixel value as compared with data of the throat part and passing through part (in this case, a portion having a low X-ray transmittance is regarded as low density, and a portion having a high X-ray transmittance is regarded as high density. Even in a converse case, it is easy for a person skilled in the art to change formula).

Additionally, in the image processing device 100, processing programs necessary for various processings in the CPU 108, various data, and the like are stored in the main memory 109. Moreover, the main memory 109 also includes a work memory for the operation of the CPU 108. Then, the CPU 108 reads the processing program stored in the main memory 109 and executes the program to perform an operation control of the entire device according to the operation in the operation panel 110. Thereby, the image processing device 100 operates as follows:

First, when a user gives an instruction to start photographing in the operation panel 110, the X-ray generating circuit 101 radiates the X-ray beam 102 to the object 103.

The X-ray beam 102 radiated from the X-ray generating circuit 101 is attenuated and transmitted through the object 103 to reach the two-dimensional X-ray sensor 104.

The two-dimensional X-ray sensor 104 converts the X-ray beam 102 transmitted through the object 103 from the X-ray generating circuit 101 into an electric signal, and outputs the signal as X-ray image data of the object 103.

The data collecting circuit 105 digitizes the X-ray image signal outputted from the two-dimensional X-ray sensor 104 and supplies the signal to the before-processing circuit 106.

The before-processing circuit 106 performs an offset correction processing, a gain correction processing, and other pre-processings on the X-ray image data from the data collecting circuit 105.

The X-ray image data subjected to the pre-processing in the before-processing circuit 106 is, by control of CPU 108, transmitted via the CPU bus 107, once stored in the main memory 109, then supplied to the irradiation field recognizing circuit 113.

The irradiation field recognizing circuit (irradiation field area extracting circuit) 113 extracts the irradiation field area (area in which so-called "irradiation regulation" is performed by irradiating only the necessary area to prevent scattering from an unnecessary area and to prevent contrast from lowering in a photographing area) of the input image data supplied via the CPU bus 107. The irradiation field area obtained by the irradiation field recognizing circuit 113 is, by the control of CPU 108, supplied to the characteristic amount extracting circuit 114 via the CPU bus 107.

The characteristic amount extracting circuit 114 is a circuit for extracting the characteristic amount of input image, and is provided with a passing through deleting circuit 114a for deleting a passing through area and a field area contacting the passing through area over a constant width from the irradiation field area obtained by the irradiation field recognizing circuit 113; a projection preparing circuit 114b for preparing a projection from image data of the area other than the area subjected to the passing through deleting processing by the passing through deleting circuit 114a; a projection analyzing circuit 114c for analyzing the area to extract the characteristic amount (density characteristic amount) therefrom from the shape of the projection prepared by the projection preparing circuit 114b; and a characteristic amount calculating circuit 114d for calculating the characteristic amount in accordance with analysis result of the projection analyzing circuit 114c.

Additionally, the characteristic amount calculated by the characteristic amount calculating circuit 114d is supplied to the gradation conversion processing circuit 115, in which a gradation conversion processing is performed on the input image data based on the characteristic amount.

The operation of the characteristic amount extracting circuit 114 will be described hereinafter in detail with reference to a flowchart shown in FIG. 2.

First, the irradiation field recognizing circuit 113 disposed before the characteristic amount extracting circuit 114 obtains the input image data stored in the main memory 109 by the control of CPU 108, and extracts the irradiation field area in the input image data (step S200).

Subsequently, in the characteristic amount extracting circuit 114, the passing through deleting circuit 114a replaces the pixel value of the area outside the irradiation field area extracted by the irradiation field recognizing circuit 113, the passing through area in the irradiation field area, or the field area contacting the passing through area within a predetermined interval, for example, with "0" (step S201).

In the passing through deleting circuit 114a, processed image data f1(x, y) is represented by equation (1).

$$f1(x, y) = f(x, y) \times \prod_{x1=-d1}^{x1=d1} \prod_{y1=-d2}^{y1=d2} sgn(x+x1, y+y1) \quad (1)$$

In the equation (1), "f(x, y)" denotes the input image data. Moreover, sgn(x, y) is represented by equation (2) with a constant Th1 determined by experiment or the like (e.g., the value is 90% of the maximum pixel value of the entire image), and constants d1, d2 for determining the constant interval width to delete the field area.

$$sgn(x,y)=0: \text{when } f(x,y) \geq Th1$$

$$sgn(x,y)=1: \text{others} \quad (2)$$

Subsequently, the projection preparing circuit 114b binarizes the pixel value which cannot be replaced with "0" in the passing through deleting circuit 114a (the pixel value in the image data f1(x, y) after the passing through deletion processing). The binarized image data f2(x, y) is represented by equations (3) and (4).

$$f2(x,y)=sgn1(x,y) \quad (3)$$

$$sgn1(x,y)=c: f1(x,y)=0$$

$$sgn1(x,y)=0: \text{others} \quad (4)$$

Additionally, in the above equation (4), "c" is a constant, and is set to "1" here.

Subsequently, the projection preparing circuit 114b prepares projection f pro (x) to X-axis of the binarized image data f2(x, y) according to equation (5) (step S202).

$$f\ pro(x) = \int_0^{dy} f2(x, y) dy \quad (5)$$

Therefore, in the projection preparing circuit 114b, the projection f pro (x) is prepared as shown in FIG. 3A. In FIG. 3A, abscissa shows X-axis, and ordinate shows the number of pixels.

As described above, after the projection f pro (x) is prepared by the projection preparing circuit 114b, the projection analyzing circuit 114c next uses the projection f pro (x) to obtain secondary difference value f second (x), and X coordinate x1 in which the secondary difference value f second (x) reaches a maximum value by equations (6) and (7) (steps S203, S204).

$$fsecond(x)=fpro(x+d1)-2xfpro(x)-fpro(x-d1) \quad (6)$$

$$x1=\max\{fsecond(x)|0 \leq x \leq dx\} \quad (7)$$

In the equations (6) and (7), "d1" denotes a difference distance (set to "5" here), and "dx" and "dy" denote widths on X-axis and Y-axis of an image area (set to "168" here).

Therefore, in the projection analyzing circuit 114c, a shown in FIG. 3B, the secondary difference value f second (x), and the X coordinate x1 in which the secondary difference value f second (x) reaches the maximum value are obtained.

Subsequently, the projection analyzing circuit 114c obtains coordinates xr and x1 on a horizontal axis of the area from which the characteristic amount is extracted (area in the vicinity of the bone area of the throat 602, that is, area C shown by slashes in FIG. 3A) by equations (8) and (9).

$$xr=x1-d3 \quad (8)$$

$$x1=x1-d4 \quad (9)$$

In the equations (8) and (9), "d3" and "d4" denote constants, and are herein set to "10" and "20".

Moreover, the projection analyzing circuit 114c obtains coordinates yu and yd on the vertical axis of the area C by equations (10) and (11) (step S205).

$$yu=y1+fpro(x1-d3)/2+d5 \quad (10)$$

$$yd=y1+fpro(x1-d3)/2-d5 \quad (11)$$

In the equations (10) and (11), "y1" and "y2" denote low end and upper end coordinates of the image area after the passing through deletion processing in X coordinate xr (=x1−d3). Additionally, the coordinates yu and yd may be coordinates y1 and y2.

Subsequently, the characteristic amount calculating circuit 114d calculates the average value of pixel values in coordinate (x1, xr, yu, yd) obtained in the projection analyzing circuit 114c, and calculation result is used as the characteristic amount (density characteristic amount) in the gradation conversion processing circuit 115 (step S206).

Additionally, the density characteristic amount calculated here may be, for example, an intermediate value in the area C.

Figure 4:
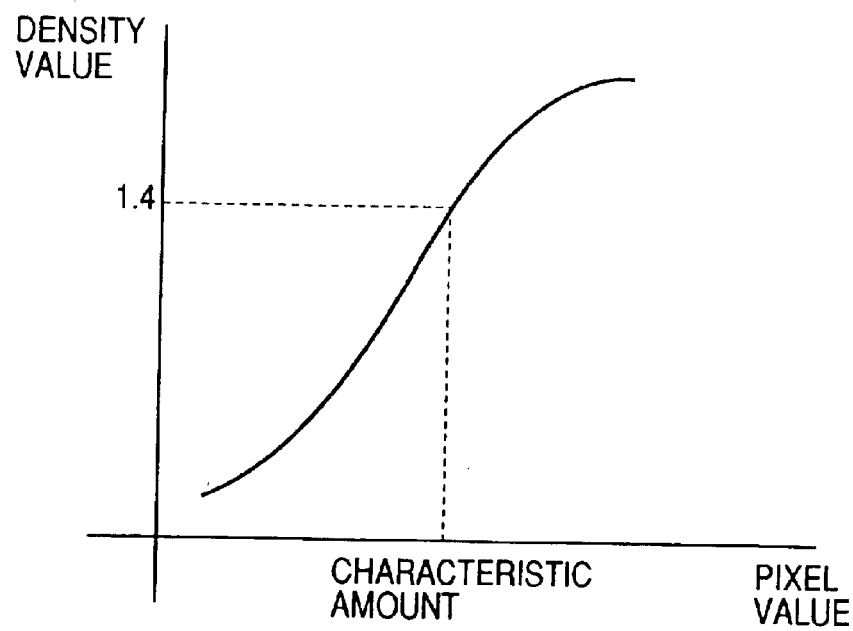
FIG. 4 is a graph showing a characteristic amount obtained by the shape of the projection.

As shown in FIG. 4, the gradation conversion processing circuit 115 converts the density value of the input image data so that the density characteristic amount obtained in the characteristic amount calculating circuit 114d indicates a density value of 1.4.

Additionally, in FIG. 4, abscissa shows the density value of the input image data, and ordinate shows the density value of output image (processed image).

The image data subjected to the gradation conversion processing in the gradation conversion processing circuit 115 is, by the control of CPU 108, displayed on a screen in the image displaying unit 111, or printed/outputted in the printer 112.

As described above, in the embodiment, the constitution comprises deleting the passing through area from the photographed image, preparing the projection of the image, and extracting the density characteristic amount from the shape of the projection, so that the density characteristic amount of the predetermined area (area C shown in FIG. 3A) can stably be extracted. Therefore, even when the density distribution of the photographed object terribly fluctuates, a stable image after the gradation conversion processing can be obtained, and an appropriate and stable image for use in diagnosis or the like can be obtained.

(Second Embodiment)

Figure 5:
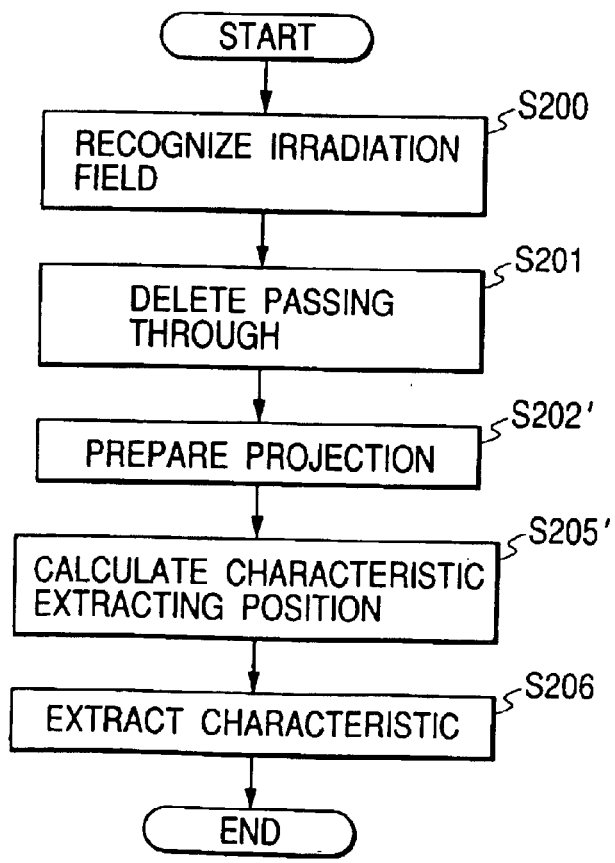
FIG. 5 is a flowchart showing the operation of the characteristic amount extracting circuit in a second embodiment.

In a second embodiment, the characteristic amount extracting circuit 114 in the first embodiment is operated, for example, as shown in the flowchart of FIG. 5.

Figure 2:
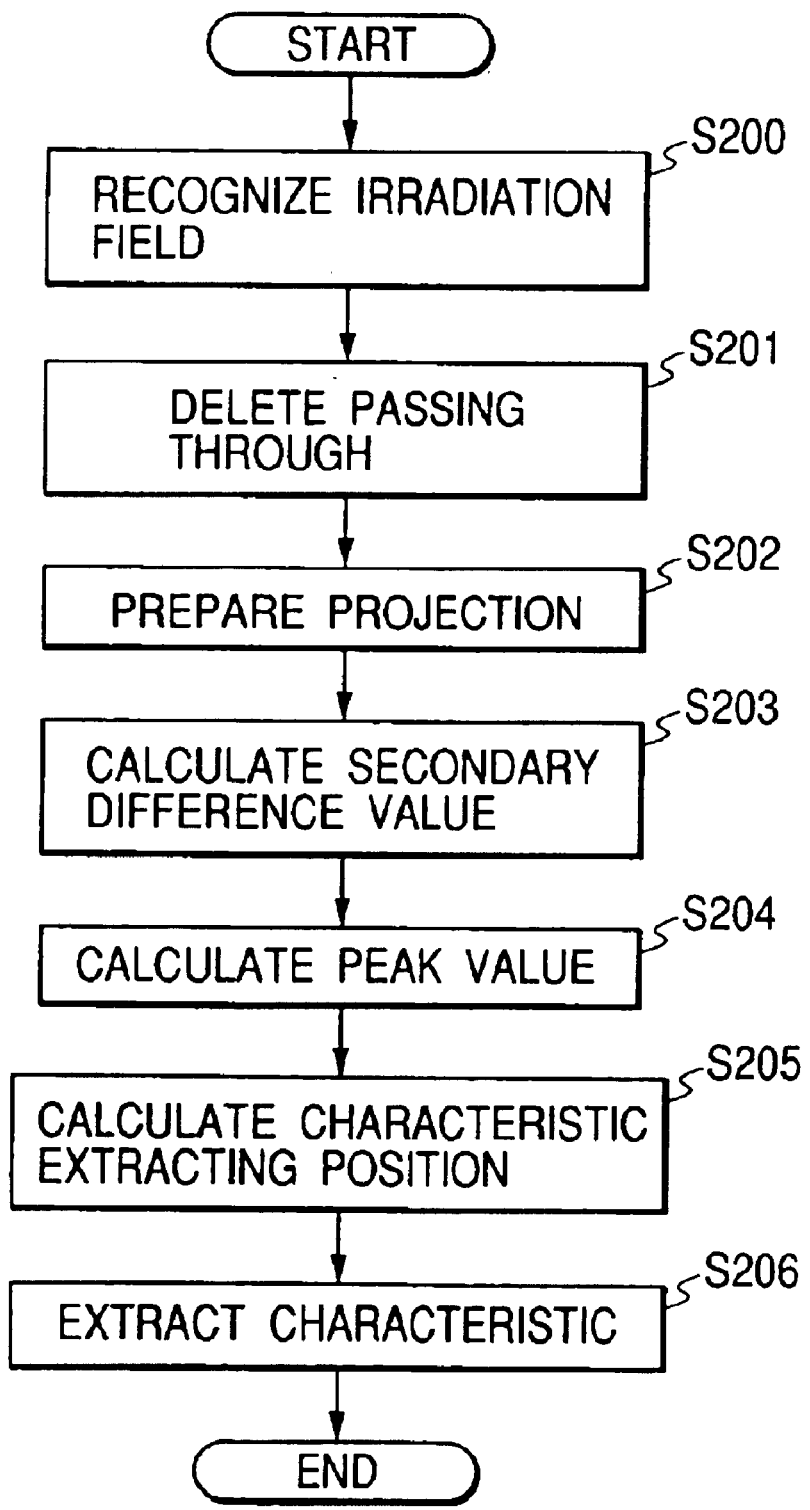
FIG. 2 is a flowchart showing the operation of a characteristic amount extracting circuit according to a first embodiment.

Additionally, in the flowchart of FIG. 5, the steps of executing processings in the same manner as in the flowchart of FIG. 2 are denoted with the same reference numerals, the detailed description thereof is omitted, and only the constitution different from that of the first embodiment will be described in detail.

First, as described above, the irradiation field recognizing circuit 113 extracts the irradiation field area from the input image data (step S200). Moreover, the passing through deleting circuit 114a deletes the area outside the irradiation field area, the passing through area in the irradiation area, and the field area contacting the passing through area with the constant width (step S201).

Figure 6B:
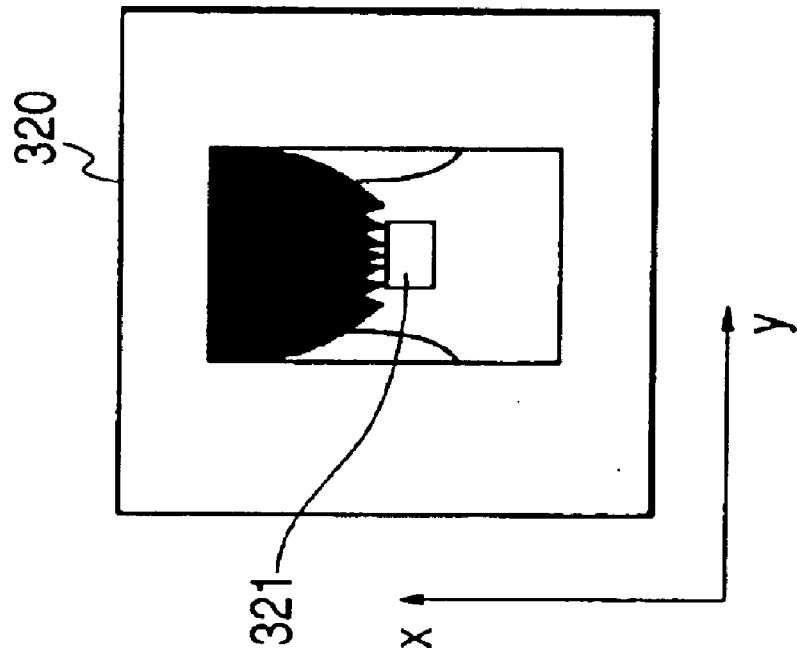
FIGS. 6A and 6B are explanatory views showing one example of a photographed image from which the characteristic amount is extracted in the characteristic amount extracting circuit.
Figure 6A:
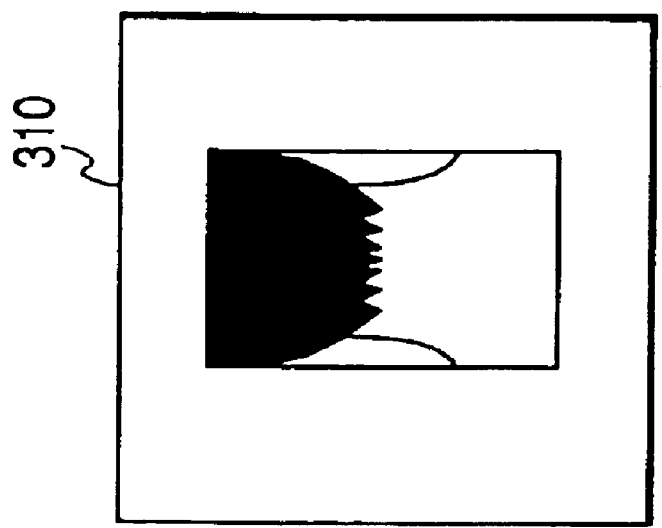

Here, for example, when the input image data comprises an image 310 of a cervical vertebra front part as shown in FIG. 6A in the same manner as the first embodiment, the image subjected to the passing through deletion processing in the passing through deleting circuit 114a turns to an image 320 as shown in FIG. 6B.

Additionally, an area 321 shown in FIG. 6B (white square portion in a central portion) indicates a characteristic amount extracting area.

Subsequently, the projection preparing circuit 114b prepares a weighting projection f pro2 (x) to X-axis of the image data f2(x, y) obtained by binarizing the pixel value which cannot be replaced with "0" in the passing through deleting circuit 114a (the pixel value in the image data f1(x, y) after the passing through deletion processing) according to equation (12) (step S202').

$$f\ pro2(x) = \int_0^{dy} f2(x, y) \times f3(x, y) dy \qquad (12)$$

In the equation (12), "f3(x, y)" denotes a simple decrease function of pixel value. Examples of the function include functions represented by equations (13) and (14), and the form is not limited.

$$f3(x,y)=c1/(f1(x,y)+c2) \qquad (13)$$

$$f3(x,y)=(c3-f1(x,y))\times(c3-f1(x,y)) \qquad (14)$$

Additionally, in the equations (13) and (14), "c1", "c2", and "c3" ($\geq$max) denote constants, and "max" denotes the maximum pixel value which can be taken by the image.

Figure 7:
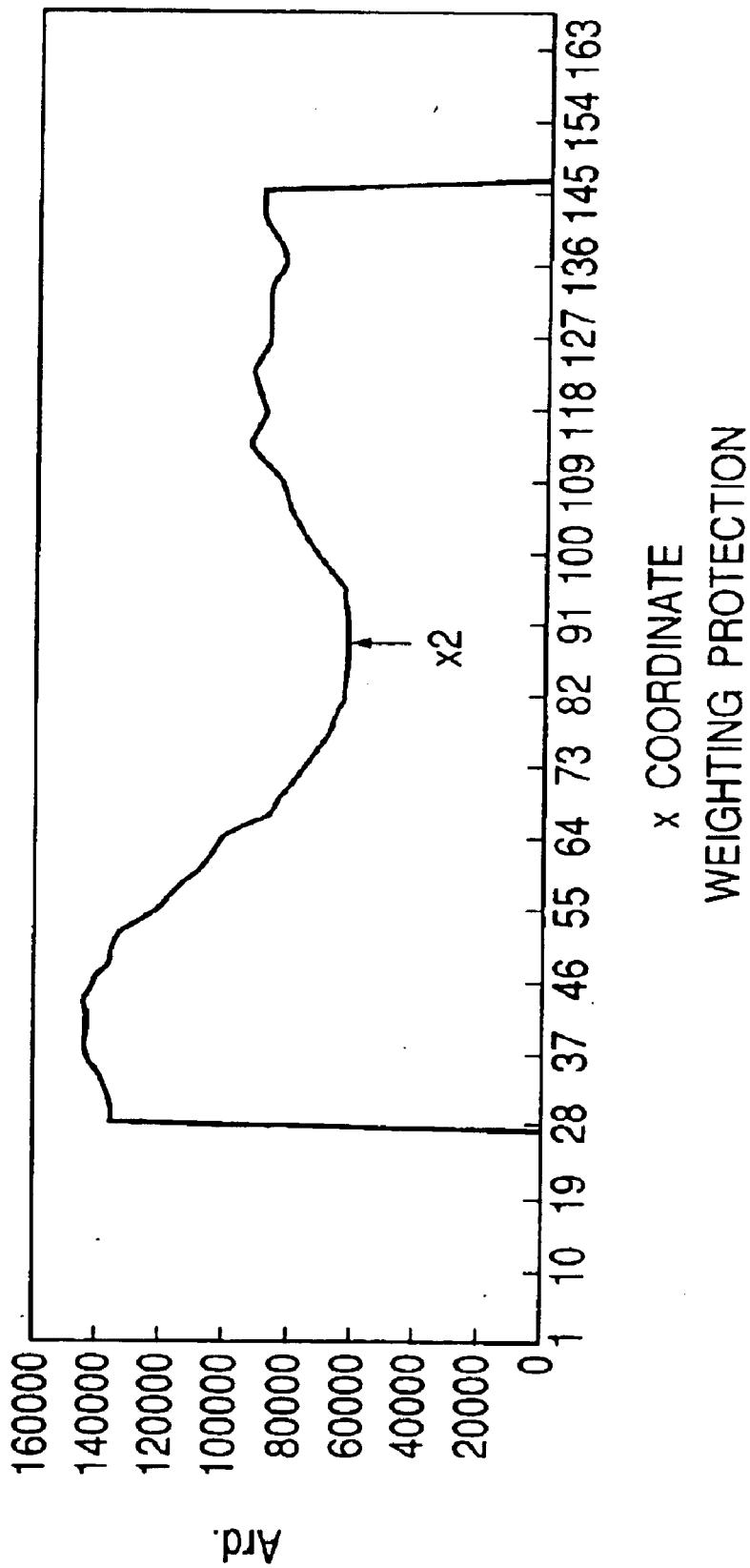
FIG. 7 is a graph showing the projection obtained in the characteristic amount extracting circuit.

Therefore, in the projection preparing circuit 114b, the weighting projection f pro2 (x) is prepared as shown in FIG. 7.

The projection analyzing circuit 114c uses the projection f pro2 (x) prepared by the projection preparing circuit 114b to obtain X coordinate x2 indicating a minimum value in which the projection f pro2 (x) is not "0" by equation (15) (step S205').

$$x2=min\{fpro2(x)|0\leq x\leq dx,\ \text{and}\ fpro2(x)>0\} \qquad (15)$$

Therefore, the X coordinate x2 obtained in the projection analyzing circuit 114c is replaced with the X coordinate x1 in the first embodiment, the coordinate (x1, xr, yu, yd) of the characteristic amount extracting area is calculated in the same manner as the first embodiment, the average value of the pixel values in the coordinate is calculated as the density characteristic amount for use in the gradation conversion processing circuit 115, and the subsequent processing is advanced.

As described above, in the embodiment, the projection for use in extracting the characteristic amount extracting area is constituted to be the projection f pro2 (x) weighted with the pixel value. For example, in the vicinity of the low density portion such as a chin overlapping the noted area, the projection rises. Therefore, the characteristic amount extracting area (throat) can be extracted with higher precision. Therefore, the characteristic amount for use in the gradation conversion processing can be obtained more stably.

Moreover, in the constitution, since the characteristic amount extracting area is extracted using only the X coordinate x2 indicating the minimum value in which the projection f pro2 (x) is not "0" without using the secondary difference value f second (x), a high processing speed can be attained.

Furthermore, since the position where the value of the projection f pro2 (x) indicates the minimum value necessarily corresponds to a neck part (bone area of the throat), a more stable characteristic amount can be obtained.

Additionally, in the second embodiment, the projection f pro (x) of the first embodiment may be used to extract the characteristic amount extracting area. Conversely, in the first embodiment, the projection f pro2 (x) weighted with the pixel value may be used to extract the characteristic amount extracting area.

(Third Embodiment)

Figure 8:
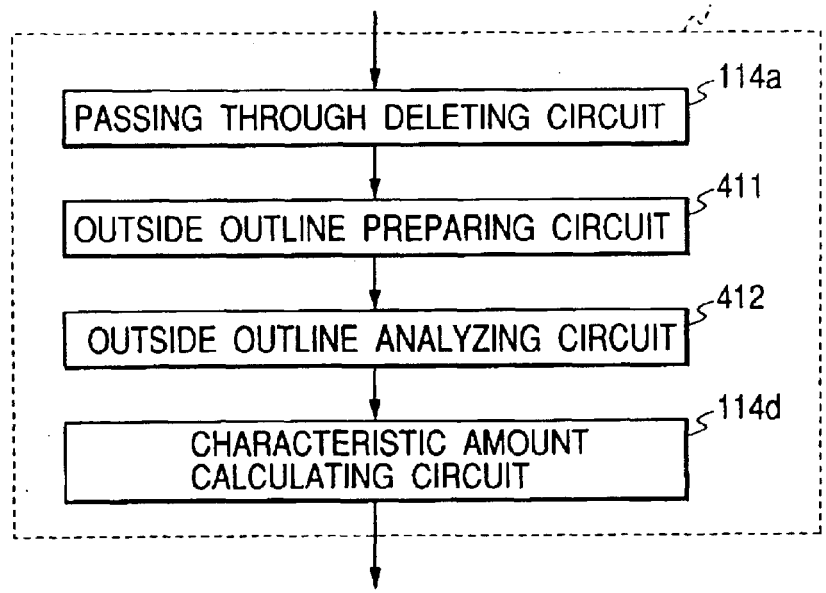
FIG. 8 is a block diagram showing the constitution of the characteristic amount extracting circuit in a third embodiment.

In a third embodiment, the inside of the characteristic amount extracting circuit 114 of FIG. 1 in the first embodiment is constituted, for example, as shown in FIG. 8.

Specifically, here in the characteristic amount extracting circuit 114, instead of the projection preparing circuit 114b and the projection analyzing circuit 114c shown in FIG. 1, there are provided an outside outline preparing circuit 411 for preparing the outside outline of the area which cannot be replaced with "0" in the projection preparing circuit 114b, and an outside outline analyzing circuit 412 for extracting the characteristic amount extracting area from the shape of the outside outline prepared in the outside outline preparing circuit 411.

Additionally, in the characteristic amount extracting circuit 114 of FIG. 8, the sections operating in the same manner as in the characteristic amount extracting circuit 114 of FIG. 1 are denoted with the same reference numerals, the detailed description thereof is omitted, and here only the constitution different from that of the first embodiment will be described in detail.

Figure 9:
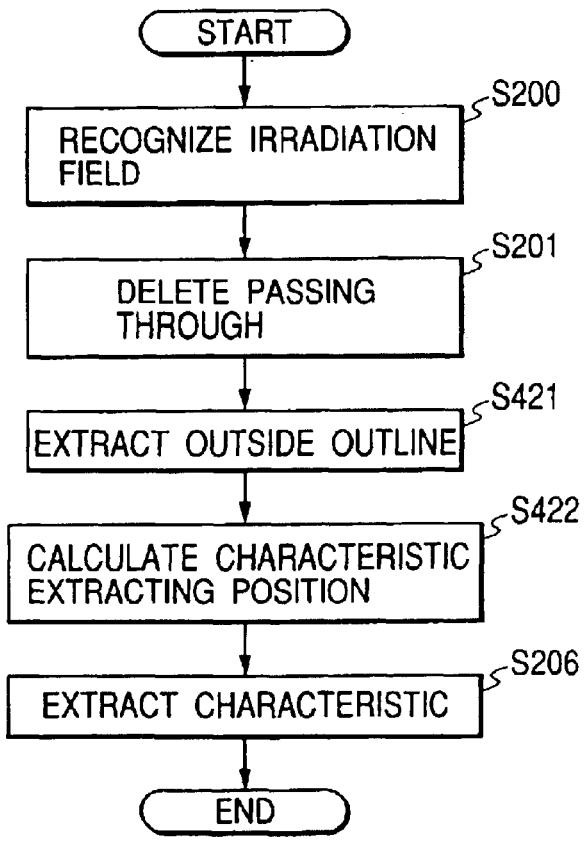
FIG. 9 is a flowchart showing the operation of the characteristic amount extracting circuit.

The characteristic amount extracting circuit 114 is operated, for example, as shown in the flowchart of FIG. 9.

Additionally, in the flowchart of FIG. 9, the steps executing processings in the same manner as in the flowchart of FIG. 2 are denoted with the same reference numerals, and the detailed description thereof is omitted.

First, as described above, the irradiation field recognizing circuit 113 extracts the irradiation field area from the input image data (step S200). Moreover, the passing through deleting circuit 114a deletes the area outside the irradiation field area, the passing through area in the irradiation area, and the field area contacting the passing through area with the constant width (step S201).

Figure 10B:
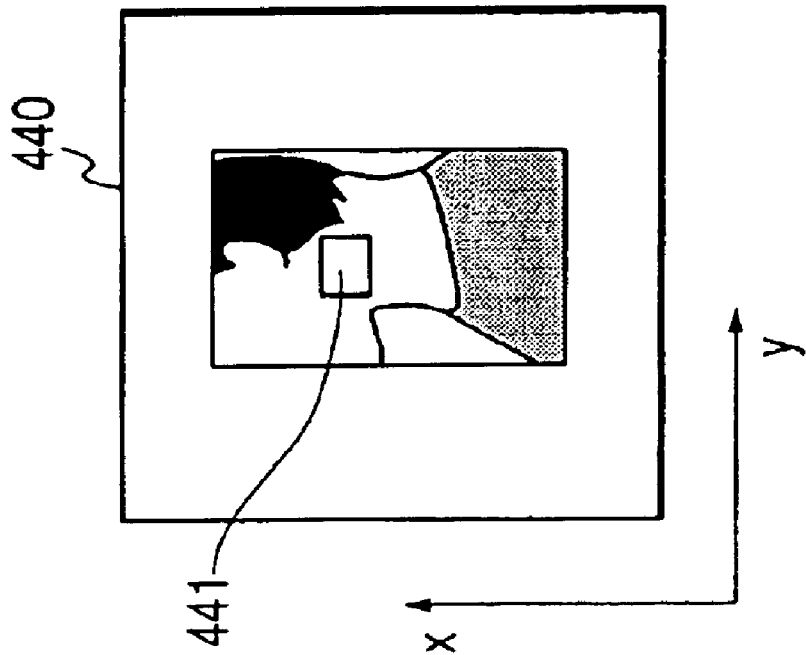
FIGS. 10A and 10B are explanatory views showing one example of the photographed image from which the characteristic amount is extracted in the characteristic amount extracting circuit.
Figure 10A:
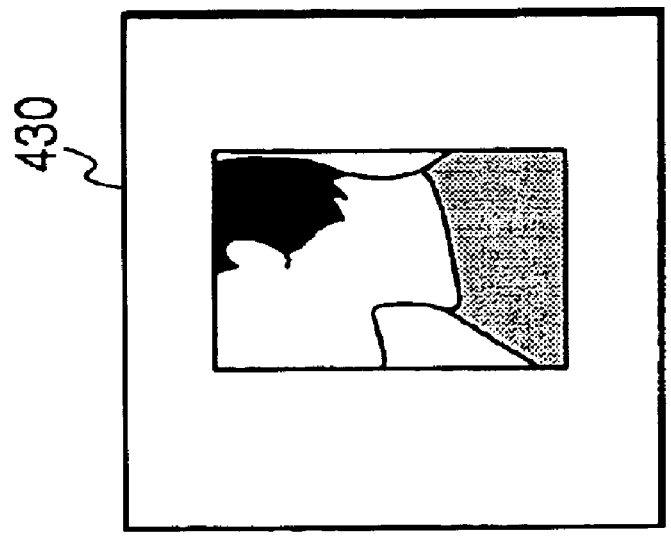

Here, for example, when the input image data comprises an image 430 of a cervical vertebra side part as shown in FIG. 10A, the image subjected to the passing through deletion processing in the passing through deleting circuit 114a turns to an image 440 of an outside outline as shown in FIG. 10B.

Additionally, an area 441 (white square portion in a central portion) shown in FIG. 10B indicates a characteristic amount extracting area described later. Moreover, when the area in which the pixel value is not "0" is searched in y coordinate direction, but is not found, for convenience, the outside outline is regarded as an image end portion ("0" or "dy").

Figure 11:
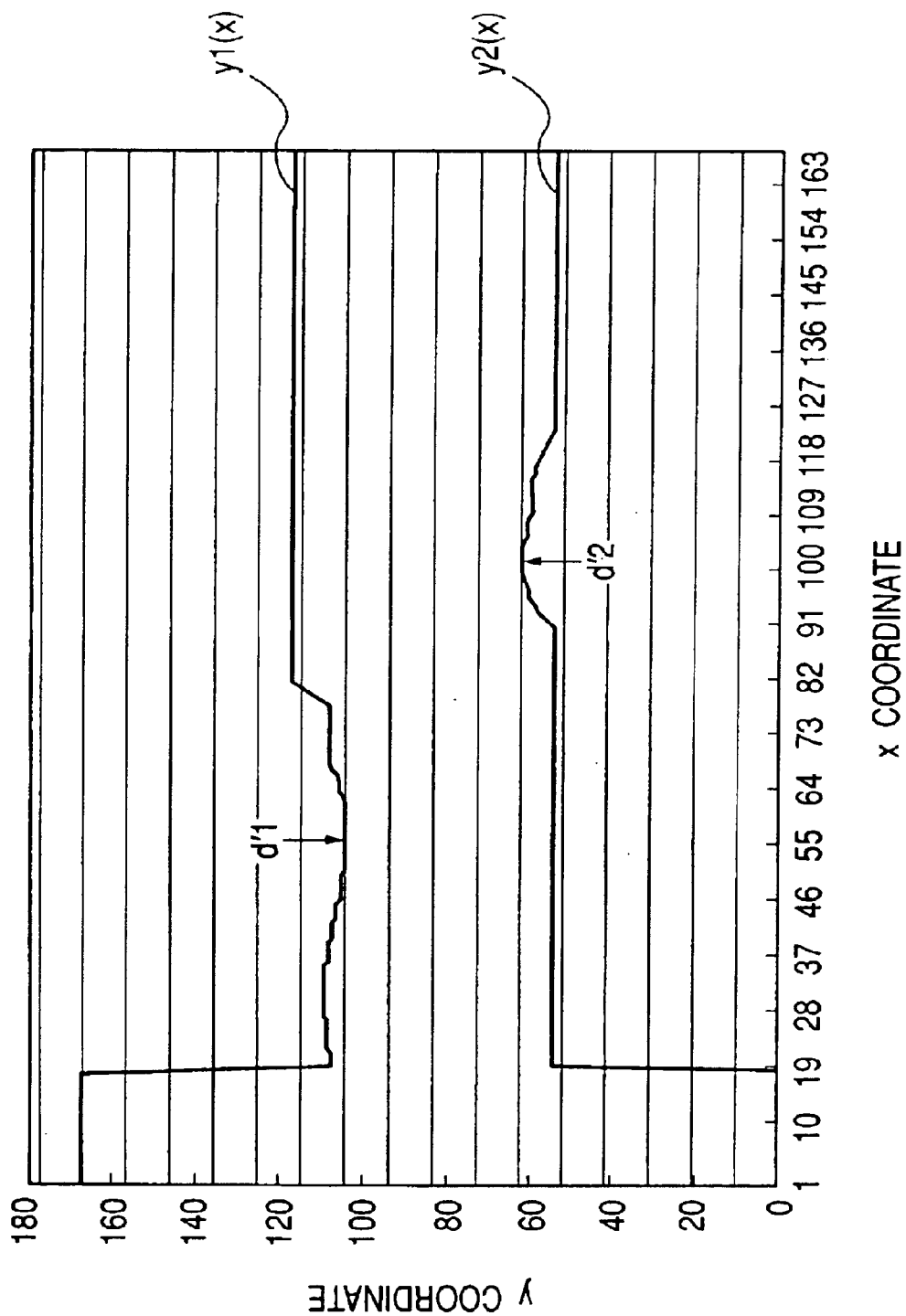
FIG. 11 is a graph showing the projection obtained in the characteristic amount extracting circuit.

Subsequently, the outside outline preparing circuit 411 extracts the outside outline as shown in FIG. 11 from the image data f2(x, y) obtained after binarizing the pixel value (pixel value in the image data f1 (x, y) after the passing through deletion processing) which cannot be replaced with "0" in the passing through deleting circuit 114a (step S421).

Here, the outside outline on the side of y=dy is set to y1(x), and the outside outline on the side of y=0 is set to y2(x). Here, the outside outline means the coordinate (hereinafter referred to as "the change coordinate") in which f2(x, y) changes to constant c from "0" in the predetermined x coordinate, the outside outline obtained by searching the change coordinate from the side of y=dy is y1(x), and the outside outline obtained by searching the change coordinate from the side of y=0 is y2(x). In this case, when no change coordinate is found, for convenience, the image end portion is regarded as the outside outline. Specifically, when scanning is performed from the side of y=dy, but no change coordinate is found, then y=dy is regarded as the outside outline. Similarly, when scanning from the side of y=0, y=0 is regarded as the outside outline.

Additionally, the outside outline analyzing circuit 412 calculates coordinate d'1 of the minimum value of the outside outline y1(x) obtained in the outside outline preparing circuit 411, and coordinate d'2 of the maximum value of the outside outline y2(x) by equations (16) and (17), and additionally calculates a starting point X coordinate x3 of the characteristic amount extracting area by equation (18) (step S422).

$$d'1 = \min\{y1(x) | 0 \leq x \leq dx\} \quad (16)$$

$$d'2 = \max\{y2(x) | 0 \leq x \leq dx\} \quad (17)$$

$$x3 = (d'1 + d'2)/2 \quad (18)$$

Additionally, the range of the coordinate x3 calculated by the above equation (18) is set so as to satisfy equation (19) or (20) with the coordinate x1 of the first embodiment and the coordinate x2 of the second embodiment. Moreover, instead of the above equation (18), equation (21) may be used.

$$x1 \leq x3 \leq (d'1 + d'2)/2 \quad (19)$$

$$x2 \leq x3 \leq (d'1 + d'2)/2 \quad (20)$$

$$x3 = x2/2 + (d'1 + d'2)/4 \quad (21)$$

Therefore, the coordinate x3 obtained in the outside outline analyzing circuit 412 is replaced with the coordinate x1 of the first embodiment, the coordinate (x1, xr, yu, yd) of the characteristic amount extracting area is calculated in the same manner as the first embodiment, the average value of pixel values in the coordinate is calculated as the density characteristic amount for use in the gradation conversion processing circuit 115, and the subsequent processing is advanced.

As described above, in the constitution of the embodiment, the characteristic amount extracting area is extracted from the depression point of the outside outline. Even when the depression positions of both end portions of the characteristic amount extracting area (noted area) deviate (e.g., like in the photographing of cervical vertebra side part, the depressions of the neck deviate in opposite neck end portions), the characteristic amount extracting area can stably be extracted. Therefore, the characteristic amount for use in the gradation conversion processing can be obtained more stably.

Moreover, when the X coordinate x3 as the coordinate information of the characteristic amount extracting area is obtained in consideration of the X coordinate x1 of the first embodiment and the X coordinate x2 of the second embodiment, for example, an effect that the characteristic amount extracting area fails to overlap the shoulder or the head can be obtained.

(Fourth Embodiment)

Figure 12A:
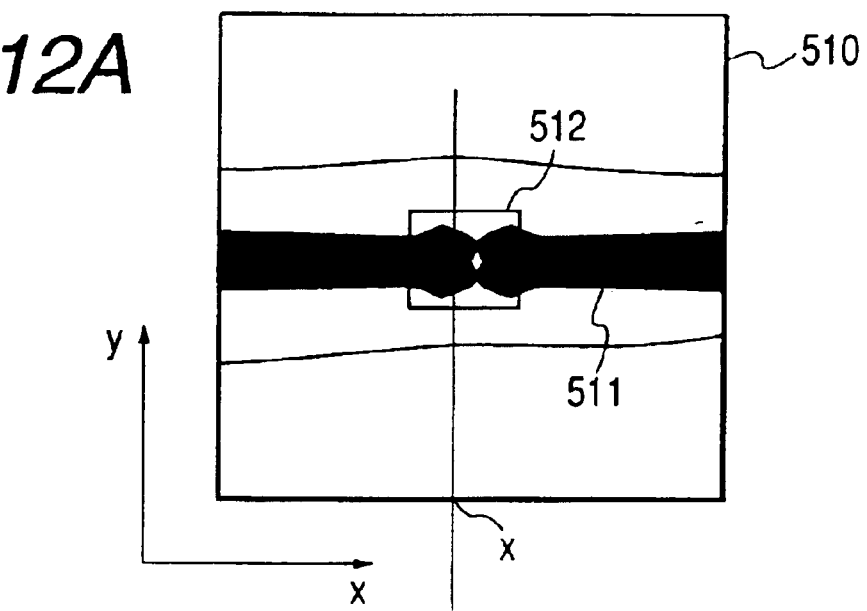
FIGS. 12A and 12B are explanatory views of the projection obtained in the characteristic amount extracting circuit in a fourth embodiment.

In a fourth embodiment, in the characteristic amount extracting circuit 114 of FIG. 1, the projection preparing circuit 114b and the projection analyzing circuit 114c are operated as follows:

First, for example, the input image data comprises an image 510 of an elbow joint part as shown in FIG. 12A. In FIG. 12A, an area 511 (dense portion) shows a bone area. In the photographing of the joint part of the elbow, a knee, and the like, there is a tendency to place a joint part in the center of the photographing area. Additionally, it is known that when the gradation conversion processing is performed so that the density value of the bone area of the joint part is set, for example, to about 1.0 on the film, the film with the gradation preferable for diagnosis can be obtained. In the drawing, an area 512 shows the characteristic amount extracting area.

Here, the projection preparing circuit 114b has a function of using the binarized image data f2(x, y) obtained by the equation (4) to prepare the projection, and additionally has a function of using the image data f2(x, y) to prepare projection f pro3 (x, y) by equation (22).

$$f\ pro3(x) = \int_0^{dy} f2(x, y) \times f4(x) dy \quad (22)$$

In the equation (22), "f4(x, y)" indicates a function dependent on the value of horizontal axis X. Examples of the function include a function represented by equation (23) with a coordinate center Xmid on X-axis.

$$f4(x) = Xmid - X \quad (23)$$

Additionally, the function f4(x, y) is not limited to the form of the above equation (23). Moreover, the coordinate center Xmid may be, for example, a center of gravity represented by equation (24).

$$xmid = \frac{\int_0^{dx} \int_0^{dy} x \times f2(x, y) dy dx}{\int_0^{dx} \int_0^{dy} f2(x, y) dy dx} \quad (24)$$

Furthermore, instead of the above equation (22), equations (25) and (26) may be used to prepare the projection f pro3 (x, y).

$$f\ pro3(x) = \int_0^{dy} f2(x, y) \times f3(x, y) \times f4(x) dy \quad (25)$$

$$f\ pro3(x) = \int_0^{dy} f2(x, y) dy \quad (26)$$

Figure 12B:
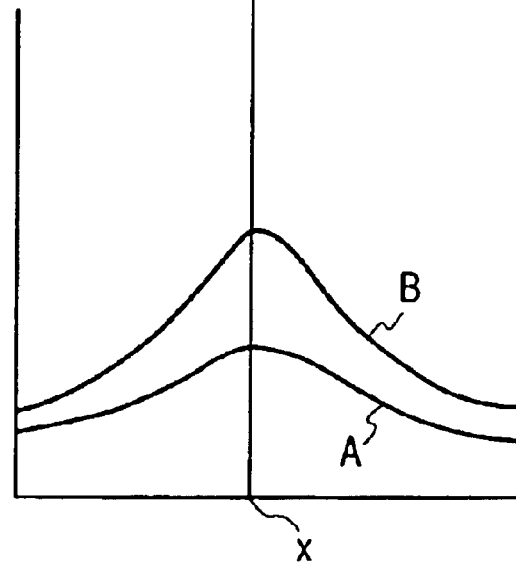

Therefore, in the projection preparing circuit 114b, the projection f pro3 (x, y) is prepared as shown in FIG. 12B. In FIG. 12B, the projection f pro3 (x, y) shown by "A" indicates a general projection, and the projection f pro3 (x, y) shown by "B" indicates a projection weighted with a distance.

Subsequently, the projection analyzing circuit 114c obtains X coordinate x4 indicating the maximum value of the projection f pro3 (x, y) prepared by the projection preparing circuit 114b by equation (27).

$$x4 = \max\{fpro3(x)|0 \leq x \leq D\} \quad (27)$$

Therefore, the coordinate x4 obtained in the projection analyzing circuit 114c is replaced with the X coordinate x1 of the first embodiment, the coordinate (x1, xr, yu, yd) of the characteristic amount extracting area is calculated in the same manner as the first embodiment, the average value of pixel values in the coordinate is calculated as the density characteristic amount for use in the gradation conversion processing circuit 115, and the subsequent processing is advanced.

As described above, in the constitution of the embodiment, the projection f pro3 (x, y) is prepared in consideration of the tendency to place the characteristic amount extracting area (joint part) in the central portion of the coordinate. Therefore, the rising of the projection in the image central portion can further be emphasized, and the coordinate of the characteristic amount extracting area can be extracted more stably. The characteristic amount for use in the gradation conversion processing can thus be obtained more stably.

(Fifth Embodiment)

Figure 13:
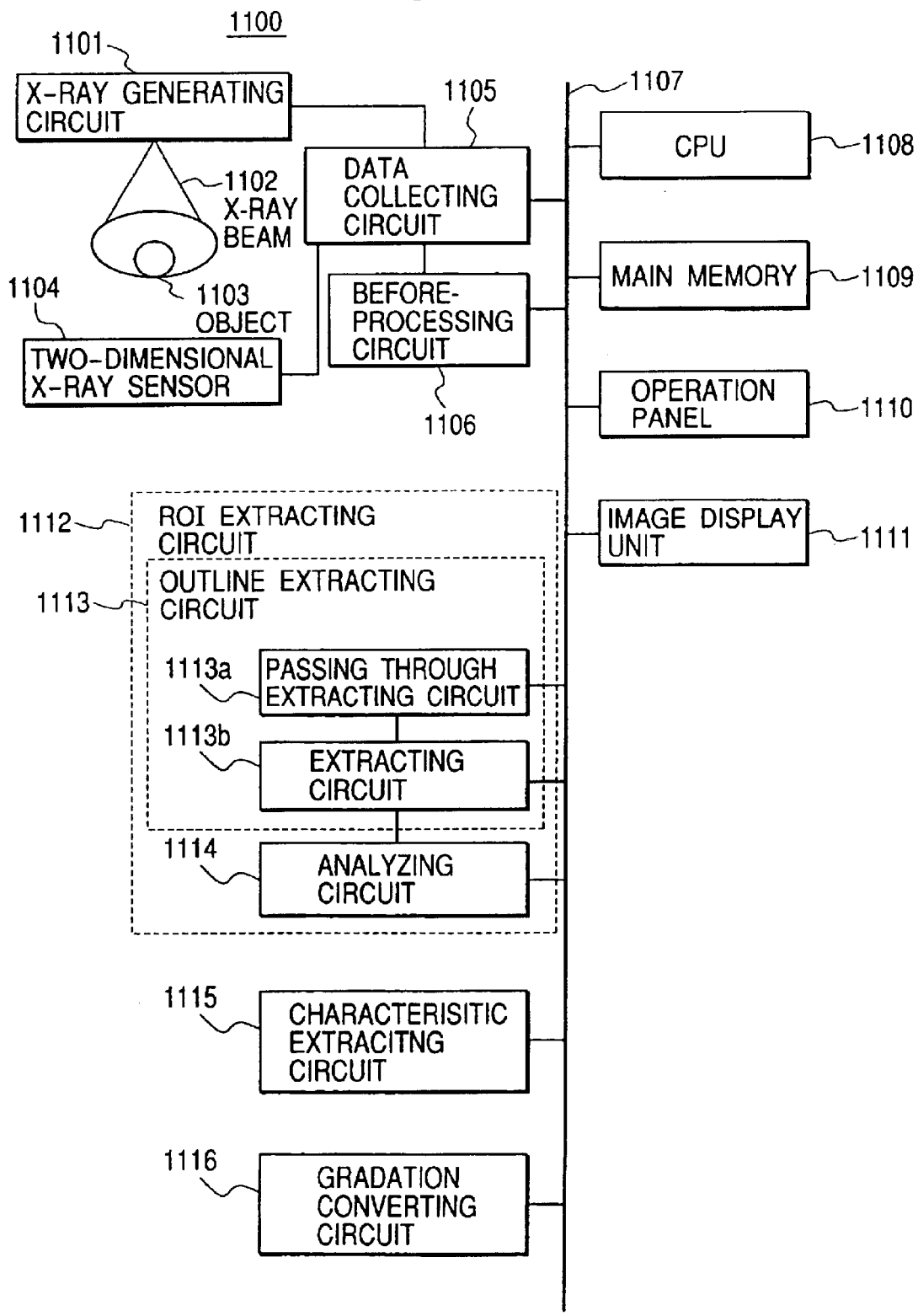
FIG. 13 is a block diagram showing one constitution example of the X-ray photographing device.

FIG. 13 shows an X-ray photographing device 1100 according to a fifth embodiment of the present invention. Specifically, the X-ray photographing device 1100 is an X-ray photographing device having an image processing function including an ROI extracting function, and is provided with a before-processing circuit 1106, a CPU 1108, a main memory 1109, an operation panel 1110, an image displaying unit 1111, an ROI extracting circuit 1112, a characteristic extracting circuit 1115, and a gradation converting circuit 1116. These components exchange data via a CPU bus 1107.

Moreover, the X-ray photographing device 1100 is provided with a data collecting circuit 1105 connected to the before-processing circuit 1106, a two-dimensional X-ray sensor 1104 connected to the data collecting circuit 1105, and an X-ray generating circuit 1101. These circuit are also connected to the CPU bus 1107.

The main memory 1109 stores various data necessary for the processing in the CPU 1108, and the like, and is additionally used as a work memory for the operation of the CPU 1108.

The CPU 1108 uses the main memory 1109 to perform the operation control of the entire device or the like according to the operation from the operation panel 1110. Thereby, the X-ray photographing device 1100 operates as follows:

First, the X-ray generating circuit 1101 radiates an X-ray beam 1102 to an object 1103. The X-ray beam 1102 radiated from the X-ray generating circuit 1101 is attenuated and transmitted through the object 1103 to reach the two-dimensional X-ray sensor 1104, and outputted as an X-ray image. Here, the X-ray image outputted from the two-dimensional X-ray sensor 1104 is, for example, a human body part image such as a shoulder image and a knee image.

The data collecting circuit 105 converts the X-ray image outputted from the two-dimensional X-ray sensor 1104 into an electric signal and transmits the signal to the before-processing circuit 1106. The before-processing circuit 1106 performs pre-processings such as an offset correction processing and a gain correction processing on the signal (X-ray image signal) from the data collecting circuit 1105. The X-ray image signal subjected to the pre-processing in the before-processing circuit 1106 is, by the control of CPU 1108, transferred as an original image to the main memory 1109 and the ROI extracting circuit 1112 via the CPU bus 1107.

As shown in the block diagram of the constitution, the ROI extracting circuit 1112 is provided with an outline extracting circuit 1113 for extracting the object outline, and an analyzing circuit 1114 for extracting the noted area (hereinafter referred to as ROI) of the object from the object outline extracted by the outline extracting circuit 1113. Moreover, the outline extracting circuit 1113 is provided with a passing through extracting circuit 1113a for extracting a passing through area, and an extracting circuit 1113b for extracting the passing through area extracted by the passing through extracting circuit 1113a and an object border line.

The characteristic extracting circuit 1115 calculates the characteristic amount such as an average value and a maximum value in ROI extracted by the analyzing circuit 1114, and the gradation converting circuit 1116 performs gradation conversion of the original image based on the characteristic amount extracted by the characteristic extracting circuit 1115.

Figure 14:
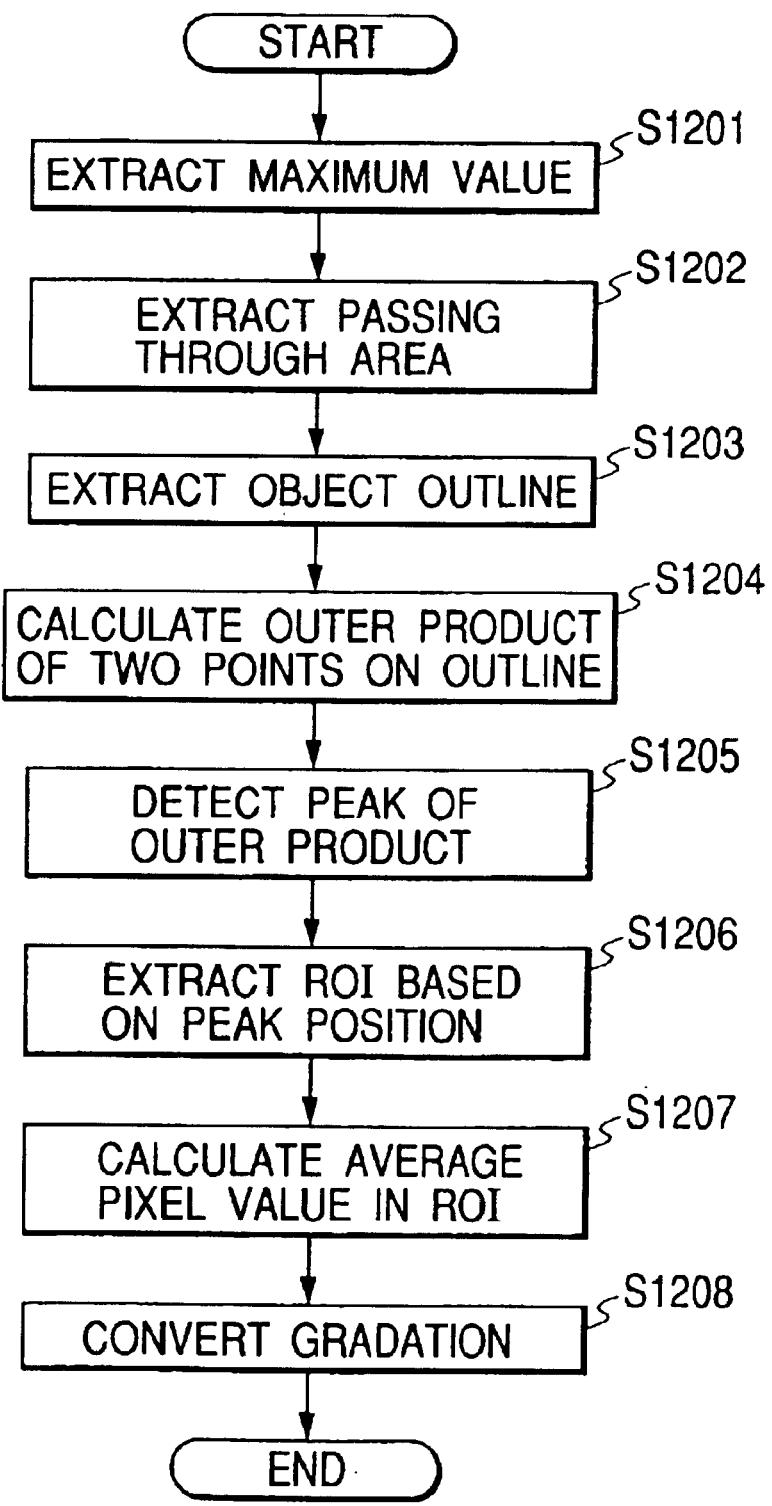
FIG. 14 is a flowchart showing a processing flow according to a fifth embodiment.
Figure 15:
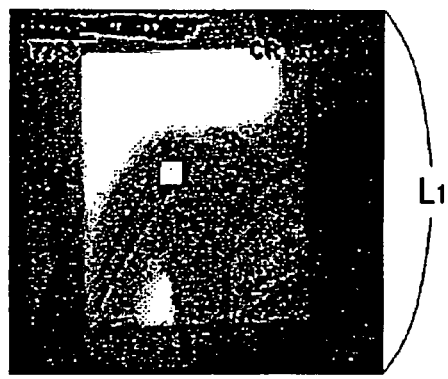
FIG. 15 is a diagram showing an original image of left shoulder and an extracted ROI.
Figure 16:
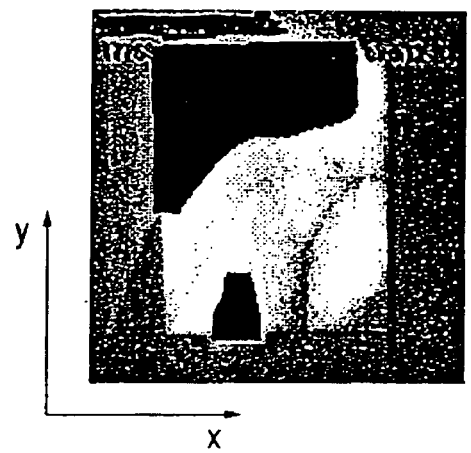
FIG. 16 is a diagram showing a passing through area of FIG. 15.
Figure 17:
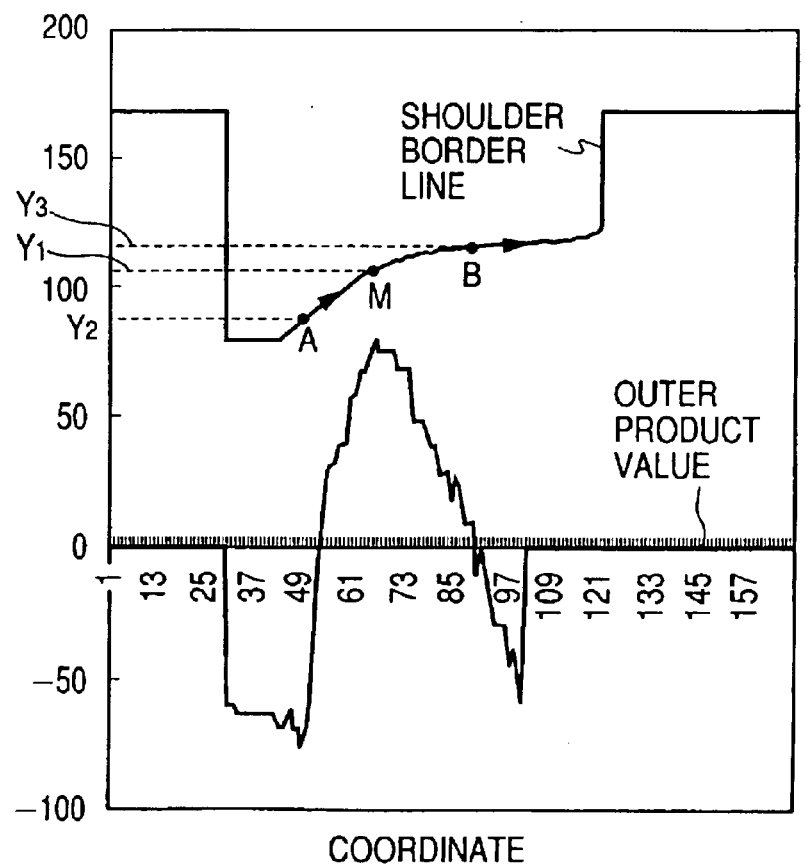
FIG. 17 is a graph showing a relation between a shoulder border line and an outer product value.
Figure 18:
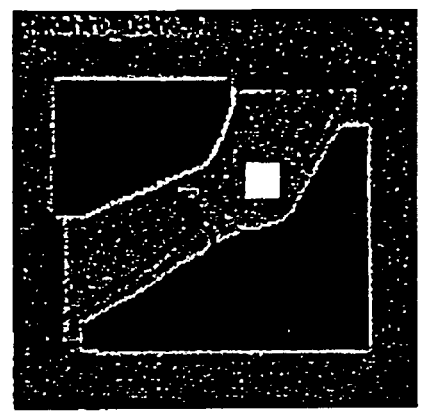
FIG. 18 is a diagram showing a knee image, a passing through area and an extracted ROI.
Figure 19:
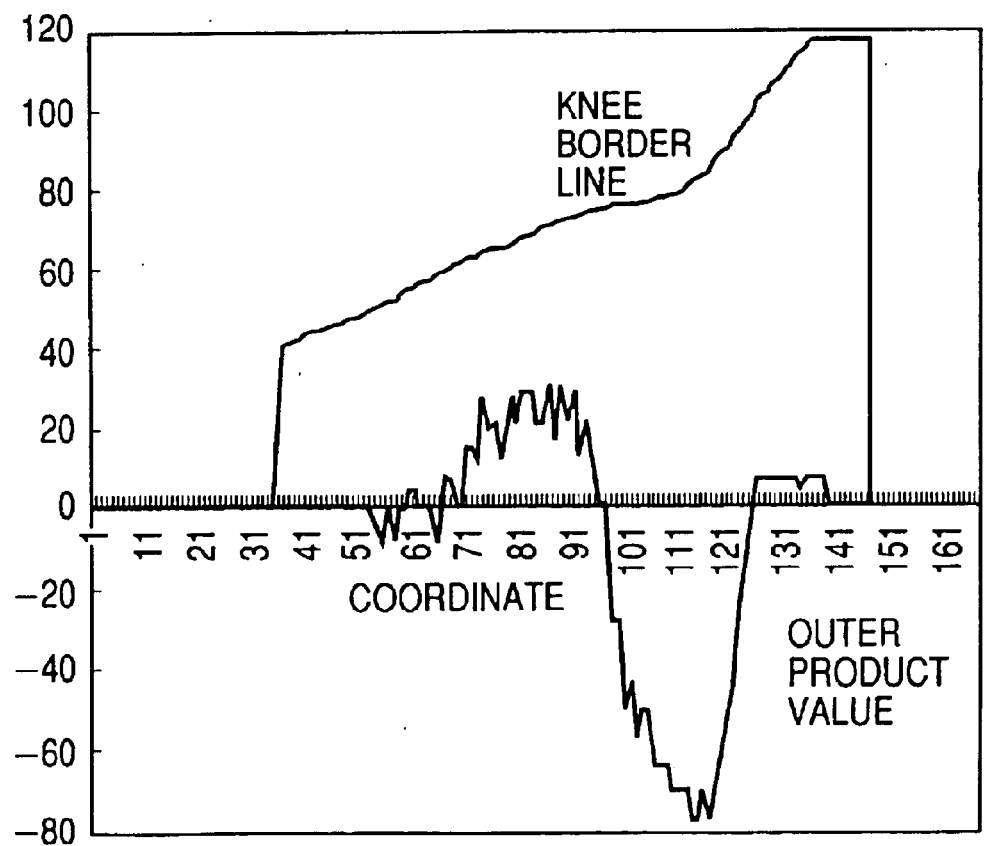
FIG. 19 is a graph showing a relation between a knee border line and an outer product value.
Figure 20:
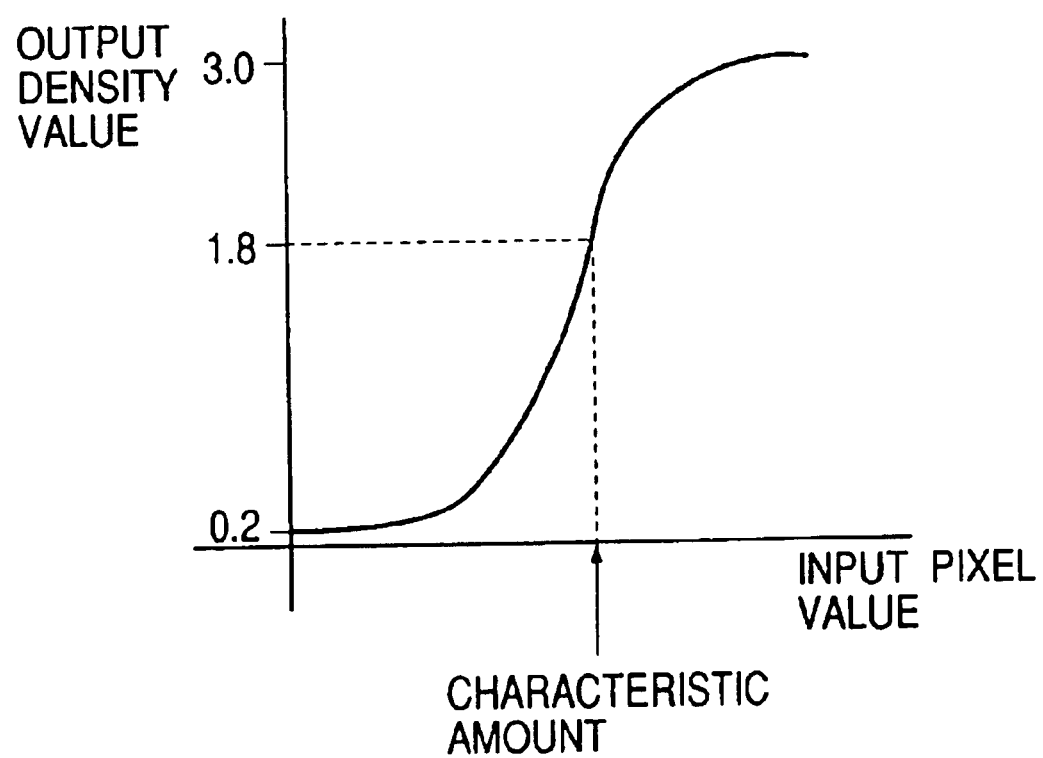
FIG. 20 is a graph showing a gradation conversion curve.

FIG. 14 is a flowchart showing the flow of an image processing. FIG. 15 shows that a square ROI is drawn on the original image of a left shoulder. FIG. 16 shows a result obtained by extracting the passing through area in the original image of FIG. 15, and a black area shows the passing through area. FIG. 17 shows a shoulder border line and an outer product value based on the shoulder border line. FIG. 18 shows a knee image, an ROI, and a passing through area (black portion). FIG. 19 shows a lower border line of the knee of FIG. 18, and an outer product value based on the lower border line. FIG. 20 shows a gradation conversion curve for use in the gradation converting circuit 1116.

The operation of the ROI extracting circuit 1112 will next be described with reference to the processing flow of FIG. 14.

The passing through extracting circuit having received the original image (e.g., shoulder image) processed by the before-processing circuit 1106 via the CPU bus 1107 by the control of CPU 1108 calculates the maximum value in the entire original image (S1201). Here, to calculate the maximum value, the histogram of the entire image is prepared, and, for example, 5% point or the like from above may be selected.

In the passing through extracting circuit 1113a, the pixel values, for example, to 95% point from the calculated maximum value are regarded as the passing through area, and the pixel value of the original image is replaced, for example, with a pixel value of 0 (black portion of FIG. 16) (S1202).

The extracting circuit 1113b extracts the outline of a field upper or lower area. Whether to extract the upper side or the lower side depends on object information.

For the outline, for example, the pixel values are searched in a vertical direction to the lower side from the upper side, and a border line on which a value of 0 changes to a value other than 0 is extracted as an object outline (S1203 of FIG. 17). Here, when the border line on which the value of 0 changes to the value other than 0 cannot be detected, the value of an image end portion is temporarily regarded as the outline (168 in FIG. 17 because the image is 168×168).

Here, any method of extracting the object outline may be used. For example, the method comprises calculating a differential value, a high-order differential difference value, and a high-order difference value for each vertical line in the irradiation area, and outlining a first peak value.

The analyzing circuit 1114 calculates a tangent line vector on the outline from the left toward the right of the image (e.g., direction between constant two points on the outline). Furthermore, the analyzing circuit 1114 calculates the outer product value of the calculated tangent line vectors. For example, in FIG. 17 the outer product value of point M is the outer product value (A×B) of vectors A, B of points A, B at equal distances from the point M on the outline (S1204 of FIG. 17).

The analyzing circuit 1114 detects the maximum value of the calculated outer product value, and sets the coordinate indicating the maximum value on the outline to be a coordinate with a highest curvature on the outline (point M, S1205).

Subsequently, an area at a constant distance in a position orthogonal to a line connecting the coordinates of two points (points A, B) of the tangent line vectors used for calculating the outer product in the point M is regarded as a noted ROI (square in FIG. 15, S1206), and the noted ROI of the shoulder image is in the vicinity of the shoulder joint.

Additionally, the distance for detecting the noted ROI is appropriately set in accordance with an input image size.

The characteristic extracting circuit 1115 calculates a representative value in the ROI as the characteristic amount. Examples of the representative value include a maximum value, a minimum value, an intermediate value, and an average value. Subsequently, the gradation converting circuit 1116 sets gradation converting conditions based on the characteristic amount calculated by the characteristic extracting circuit 1115, and converts the gradation of the original image. For example, as shown in FIG. 20, the gradation conversion curve is moved in parallel so that the characteristic amount indicates a constant density, and the gradation converting conditions are set.

In FIG. 19, a knee is used as the object, and the object outline is extracted from the lower side of the image. In FIG. 19, the minimum value of the outer product value corresponds to the point with the highest curvature. Thereafter, the same processing as the above-described processing is performed and the obtained noted ROI is shown as a square in FIG. 18. The noted ROI of this image is in the vicinity of a knee joint.

As described above, the shape of the object outline has a characteristic for extracting the noted ROI, and the noted ROI can stably be extracted based on the characteristic. Particularly, in the joint part or the like, the entire outline is characteristic, and by using a roundest point as a reference, the noted ROI of the joint part or the like can stably be extracted.

Moreover, when the passing through area is extracted based on the maximum value of the entire original image, the passing through area can stably and effectively be extracted. Therefore, when the end portion of the passing through area is used as the object outline, the object outline can stably and effectively be extracted.

Furthermore, when the representative value of the noted area is calculated, and the calculated representative value is subjected to gradation conversion to provide a constant density value, the conversion to the density aiming at the noted area can effectively be performed. Therefore, there is produced an effect that image diagnosis ability is enhanced.

(Sixth Embodiment)

Up to the fifth embodiment, the method of extracting the characteristic area in the shoulder image or the knee image based on the curvature of the object outline has been described. In a sixth embodiment, a method of extracting the characteristic area in a head image based on the shape of the object outline will be described.

Figure 21:
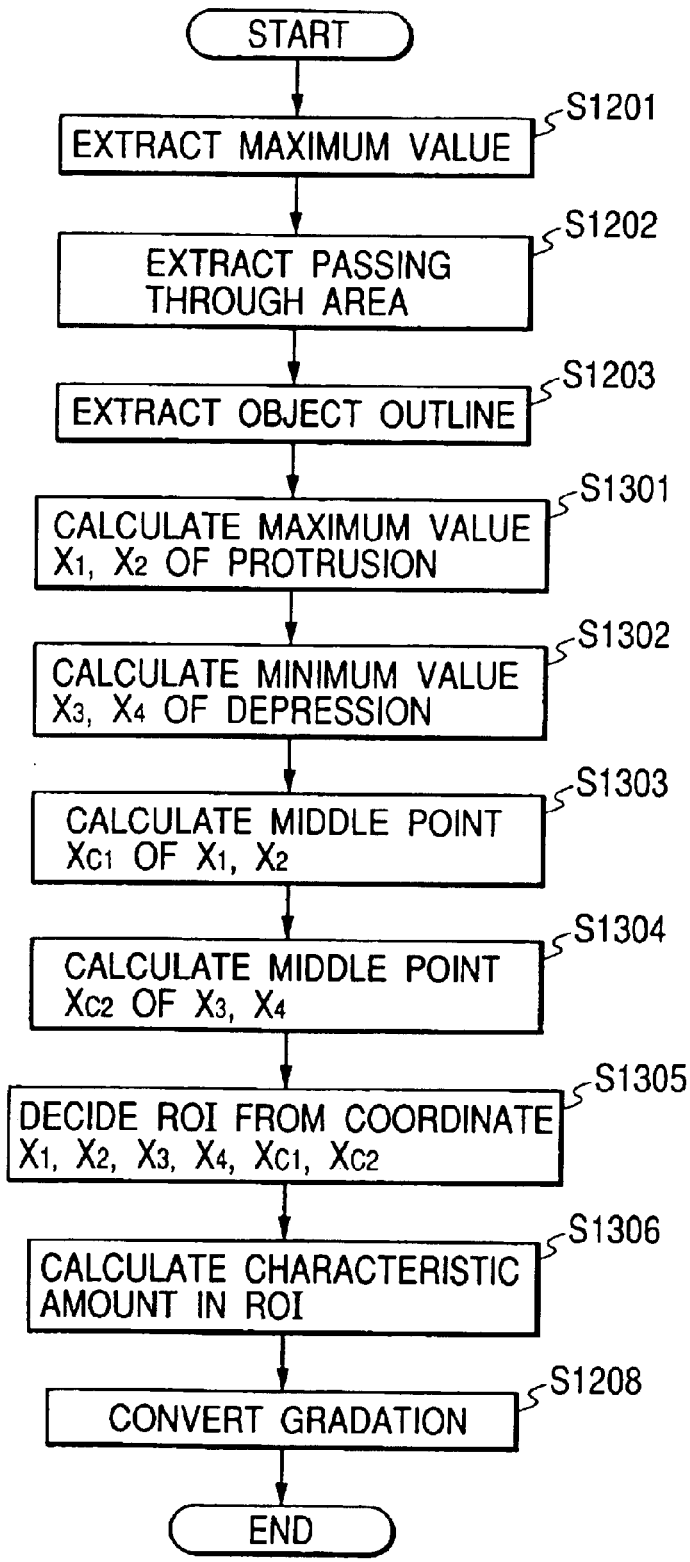
FIG. 21 is a flowchart showing a processing flow according to a sixth embodiment.

FIG. 21 is a flowchart showing the flow of an image processing performed in the X-ray photographing device according to the embodiment. Additionally, the steps performing the same processings as those in the fifth embodiment are denoted with the same reference numerals.

Figure 22B:
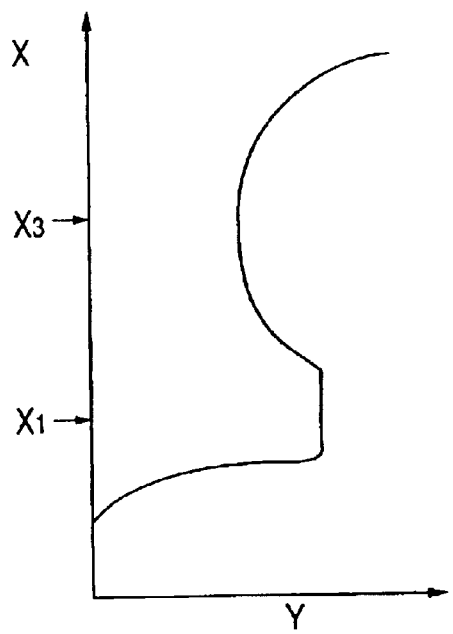
FIGS. 22A and 22B are diagrams showing an original image of a head front part, a left border line, and a noted area.
Figure 22A:
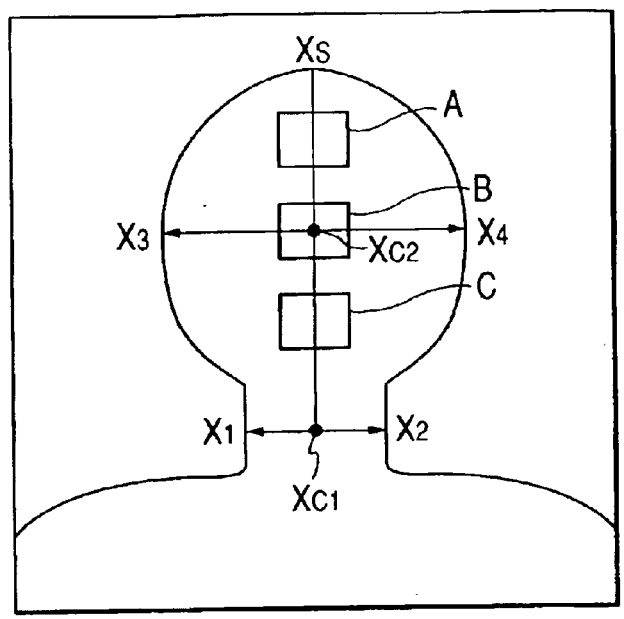
Figure 23:
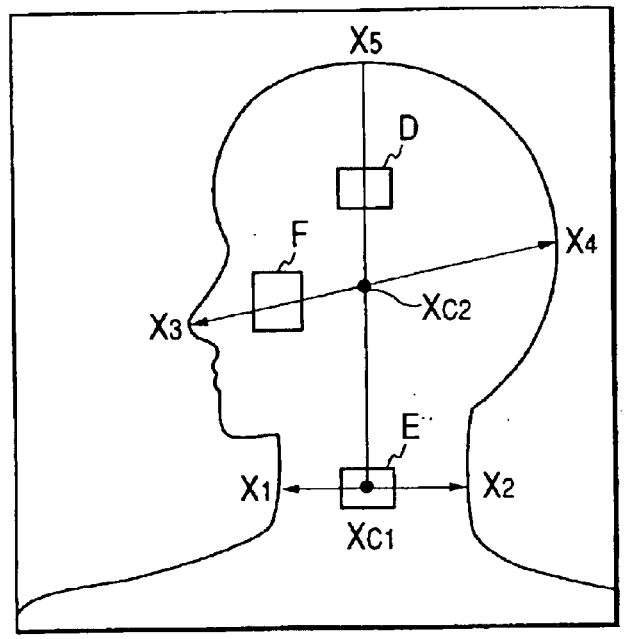
FIG. 23 is a diagram showing an original image of a head side part and a noted area.

FIG. 22A shows a head front part image and noted areas A to C, FIG. 22B shows the left outline of the object, and FIG. 23 shows a head side part image and noted areas D to F.

The passing through extracting circuit 1113a having received the original image processed by the before-processing circuit 1106 via the CPU bus 1107 by the control of CPU 1108 calculates the maximum value in the entire original image (S1201).

Here, to calculate the maximum value, the histogram of the entire image is prepared, and, for example, 5% point or the like from above may be selected. Subsequently, in the passing through extracting circuit 1113a, the pixel values, for example, to 95% point from the calculated maximum value are regarded as the passing through area, the pixel value of the original image is replaced, for example, with a pixel value of 0, and for the remaining area the pixel value of the original image is retained as it is.

The extracting circuit 1113b extracts the outline of the object area. For example, the pixel values are searched, for example, in a transverse direction from the left side to the right side of the image, the border line on which the value of 0 changes to the value other than 0 is regarded as the left outline of the object (FIG. 22B), and the border line on which the value other than 0 changes to the value of 0 is regarded as the right outline of the object (S1203). Here, any method of extracting the object outline may be used. For example, the method comprises calculating a differential value, a high-order differential difference value, and a high-order difference value for each vertical line in the irradiation area, and outlining a first peak value.

The analyzing circuit 1114 analyzes the outline extracted by the extracting circuit 1113b, and extracts a characteristic point on the outline. For example, maximum value x1 of a protrusion of the left outline, and minimum value x3 of a depression are extracted. Similarly, maximum value x2 of the protrusion of the right outline (not shown), and minimum value x2 of the depression are extracted (S1304, S1305). The analyzing circuit 1114 further calculates middle point xc1 of x1, x2, and middle point xc2 of x3, x4 (S1306, S1307).

Subsequently, the analyzing circuit 1114 calculates the noted area based on the coordinates of these points.

In FIG. 22A of the head front part image diagram, dependent on diagnosis purposes, the noted area differs to a cranium part, a nose, a mouth, and the like. For example, the middle point between x3 and x4 substantially corresponds to the nose (area B), the middle point of intersection point x5 on the line connecting Xc1 and Xc2 with the upper outline corresponds to the cranium part (area A), and the middle point between xc1 and xc2 corresponds to the mouth (area C).

Moreover, for example, in FIG. 23 of the head side part image diagram, xc1 corresponds to the cervical vertebra (area E), the middle point between x3 and xc2 corresponds to the nose (area F), and the middle point between xc2 and x5 corresponds to the cranium (area D). Here, each of the areas A to F is, for example, a square area of a constant area centering on the extracted point. Additionally, the size of the constant area is set in accordance with an original image size.

Subsequently, the characteristic extracting circuit 1115 calculates the representative value in the noted area (e.g., a maximum value, a minimum value, an intermediate value, an average value, and other statistical values) as the characteristic amount (S1306).

Then, the gradation converting circuit 1116 converts the gradation of the original image based on the characteristic amount calculated by the characteristic extracting circuit 1115 (S1208).

In general, in the diagnosis with the X-ray film image, the density value which is easily diagnosed empirically is determined for each noted area. Therefore, when the pixel value representative of the noted area is calculated, and the representative value is gradation-converted to the constant density, gradation conversion can be performed to provide the density in which the target area can easily be diagnosed.

(Seventh Embodiment)

Figure 24:
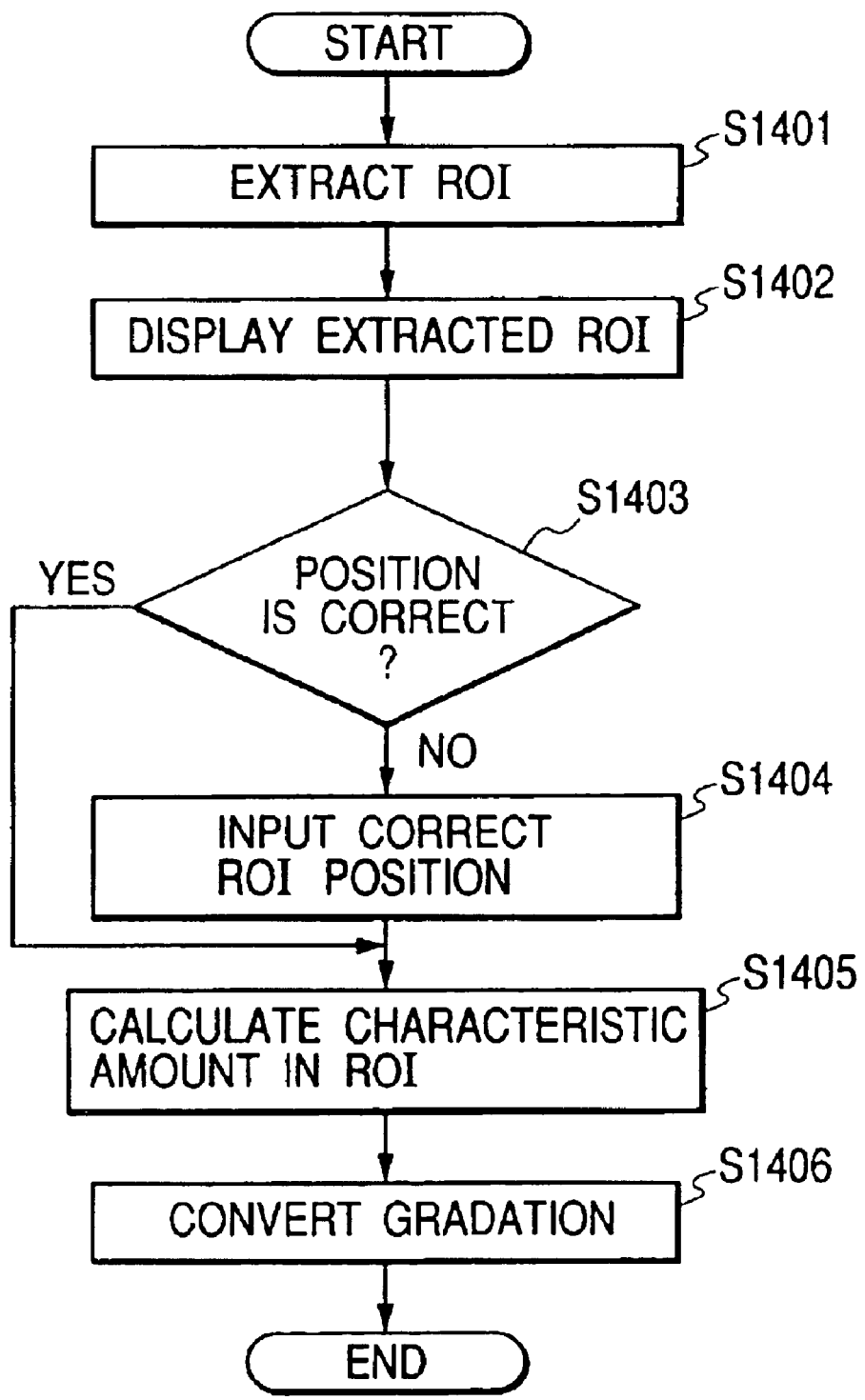
FIG. 24 is a flowchart showing a processing flow according to a seventh embodiment.

FIG. 24 shows a processing flow according to a seventh embodiment.

The ROI extracting circuit 1112 uses the method described in the above embodiment to extract the noted area of the object (S1401).

The image displaying unit 1111 displays the object and ROI together (S1402).

When the displayed ROI is in a correct position, ROI coordinate is not changed. When the ROI position is changed, coordinate information to be changed is inputted from the operation panel 1110 (S1403, S1404).

Subsequently, the characteristic extracting circuit 1115 calculates the characteristic amount in the ROI (S1405), and the gradation converting circuit 1116 converts the gradation of the original image based on the characteristic amount (S1406).

As described above, according to the seventh embodiment, since the ROI is displayed with the object, it can be confirmed whether the ROI position is correctly and automatically set.

Furthermore, the ROI position can be changed. Therefore, even if the extracting of ROI area is unsuccessful, the position can be corrected to be an adequate position.

(Eighth Embodiment)

The method of extracting the object noted area described in the fifth embodiment is on the assumption that either the right or the left site be extracted. In this case, there are extraction processings for both the right site and the left site. For example, in the extraction processing for the left shoulder, the pixel value of the left shoulder joint area is extracted, while in the extraction processing for the right shoulder, the pixel value of the right shoulder joint area is extracted.

Moreover, when photographing is performed on the object laid on a photographing stand, the vertical direction of the image (e.g., the direction of the head during the photographing of the head) is reversed in some cases. Specifically, in the photographed image, the head is directed upward in some cases, and directed downward in other cases. Therefore, when the head is directed downward, the display of the image is reversed.

In the embodiment, a mode of processing for automatically judging an object posture will be described.

In the embodiment, the object posture is judged based on the object outline extracted by the outline extracting circuit 1113. By adding a circuit for judging the posture and reversing the image based on the judgment described later to the X-ray photographing device of FIG. 13, the embodiment can be realized.

Figure 25:
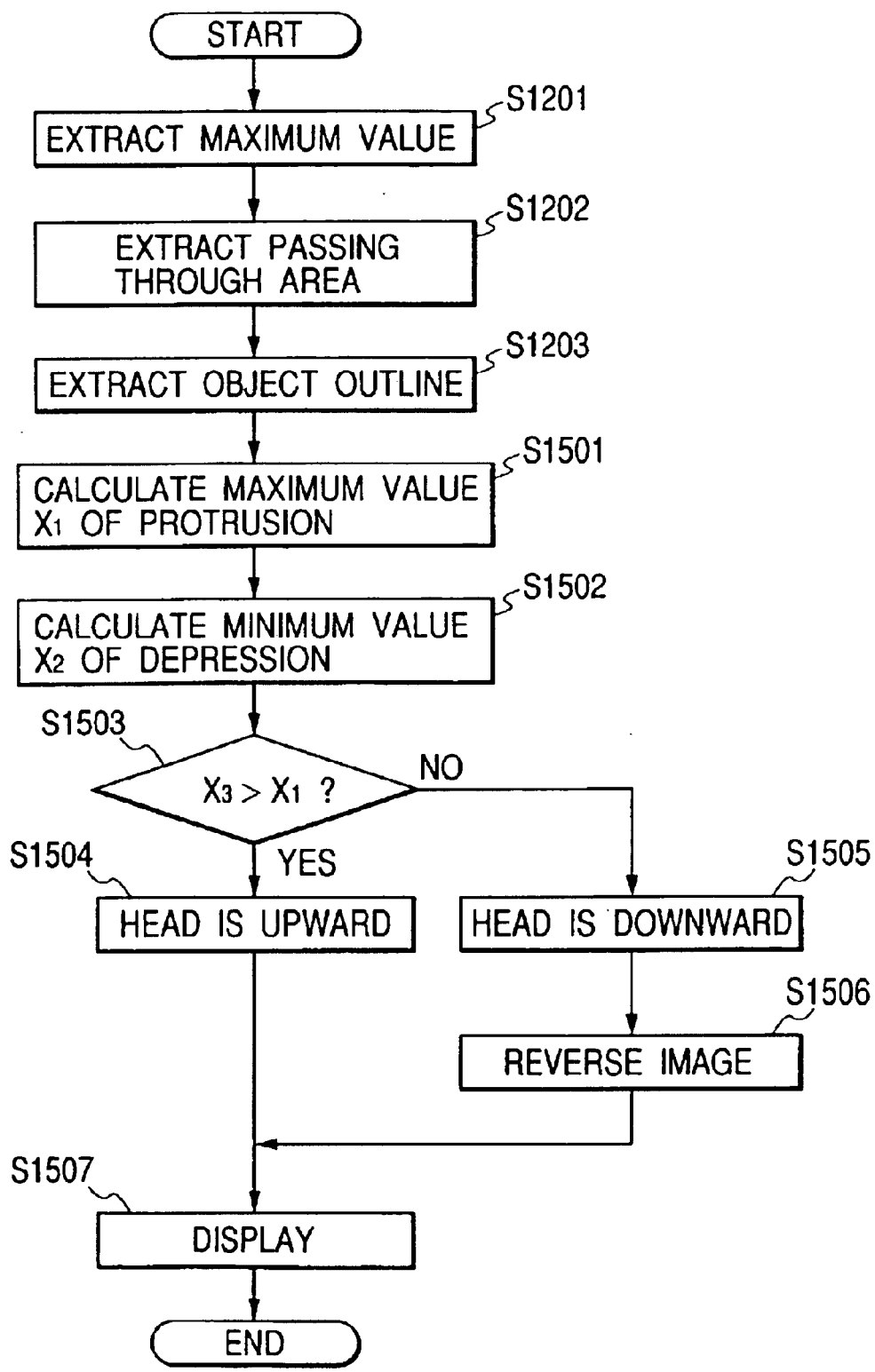
FIG. 25 is a flowchart showing a processing of judging a posture of a head image.

FIG. 25 shows the flow of a processing for judging the posture, that is, the vertical direction of the head image based on an object outline shape. Additionally, the same steps as those of FIG. 21 showing the processing for extracting the characteristic area of the head image are denoted with the same reference numerals.

The maximum value in the entire head image (FIG. 22A) processed in the before-processing circuit 1106 is calculated (S1201). The pixel values, for example, to 95% point from the calculated maximum value are regarded as the passing through area, the pixel value of the original image is replaced, for example, with a pixel value of 0, and for the remaining area the pixel value of the original image is retained as it is (S1202).

Subsequently, in the outline extracting circuit 1113, the pixel values are searched in the transverse direction from the left side to the right side of the image, the border line on which the value of 0 changes to the value other than 0 is regarded as the left outline of the object (FIG. 22B), and the border line on which the value other than 0 changes to the value of 0 is regarded as the right outline of the object (S1203). Here, any method of extracting the object outline may be used. For example, the method comprises calculating the differential value, the high-order differential value, and the high-order difference value for each vertical line in the irradiation area, and outlining the first peak value.

As shown in FIG. 22B, the maximum value x1 of the protrusion of the left outline extracted in S1203, and the minimum value x3 of the depression are extracted (S1501, S1502). Then, the coordinates of x1, x3 are compared. When the coordinate value of x3 is larger than that of x1, it is judged that the head is upward in the image. In the other cases, it is judged that the head is downward in the image (S1503, S1504, S1505). Furthermore, when it is judged in the analyzing circuit 1114 that the head is downward, the vertical direction of the image is reversed (S1506).

The image displaying unit 1111 displays the reversed image when the original image is reversed, and displays the original image when it is not reversed.

Since the depression and protrusion of the object outline have clear characteristics, by comparing the coordinates of the depression and protrusion, the object posture can stably be judged. Moreover, since the vertical direction of the object can constantly be displayed accurately, diagnosis efficiency can be enhanced.

Figure 26:
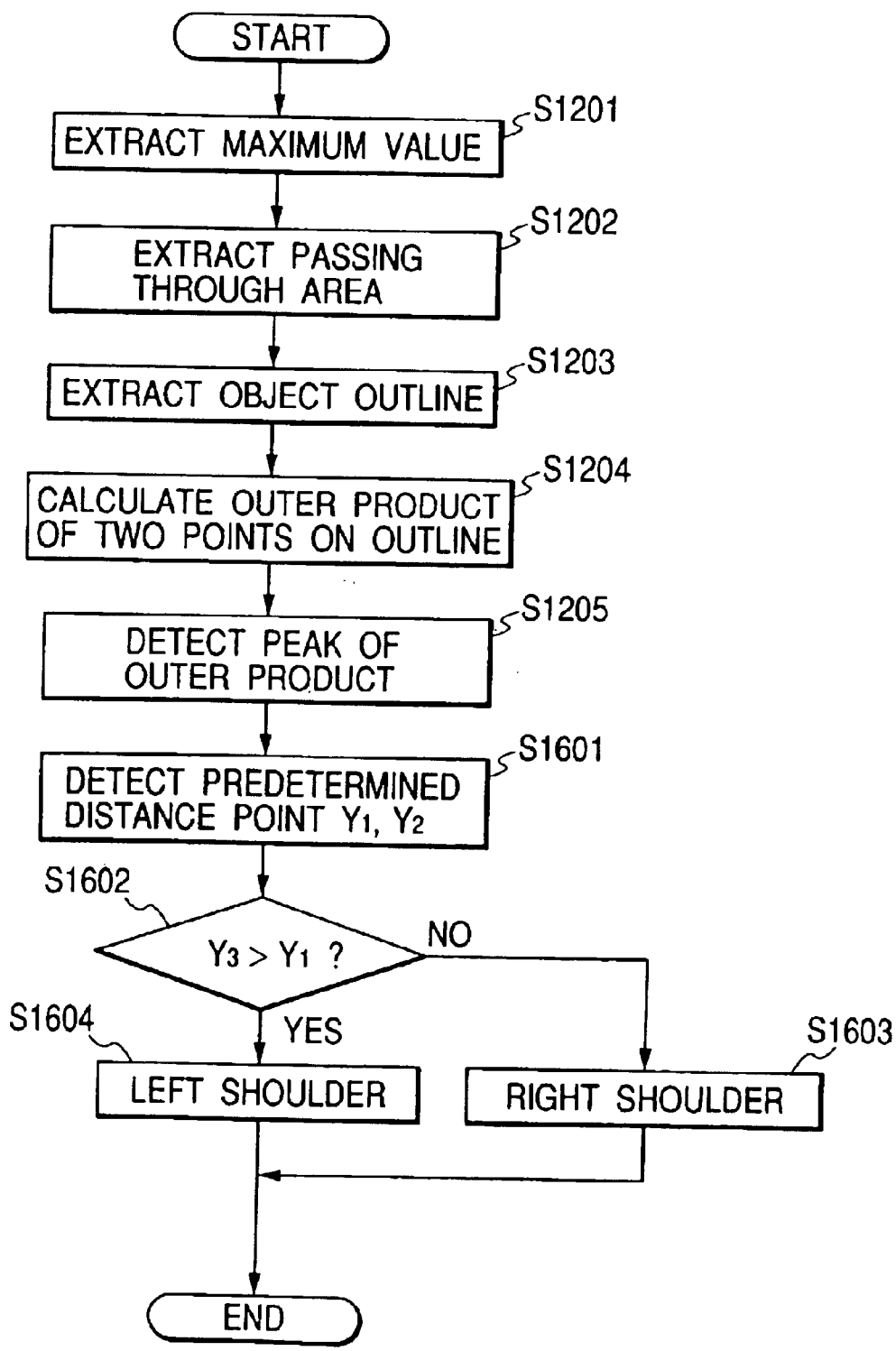
FIG. 26 is a flowchart showing a processing of judging a posture of a shoulder image.
Figure 27:
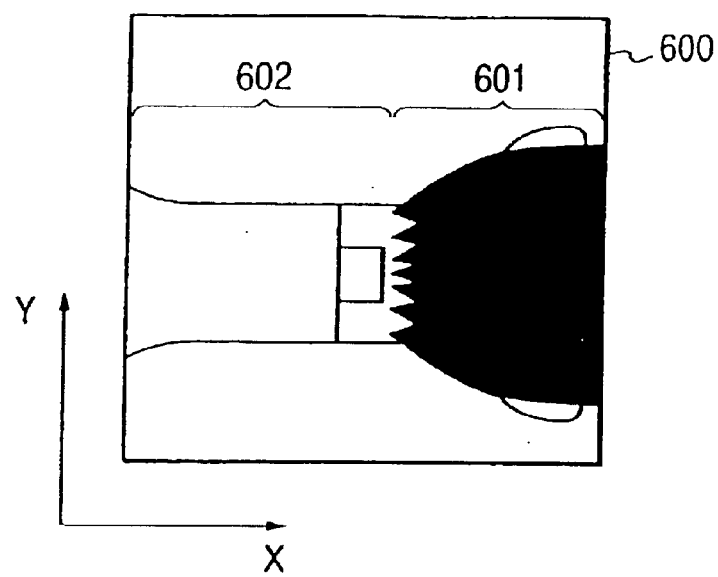
FIG. 27 is an explanatory view of a conventional characteristic amount extracting method.
Figure 28:
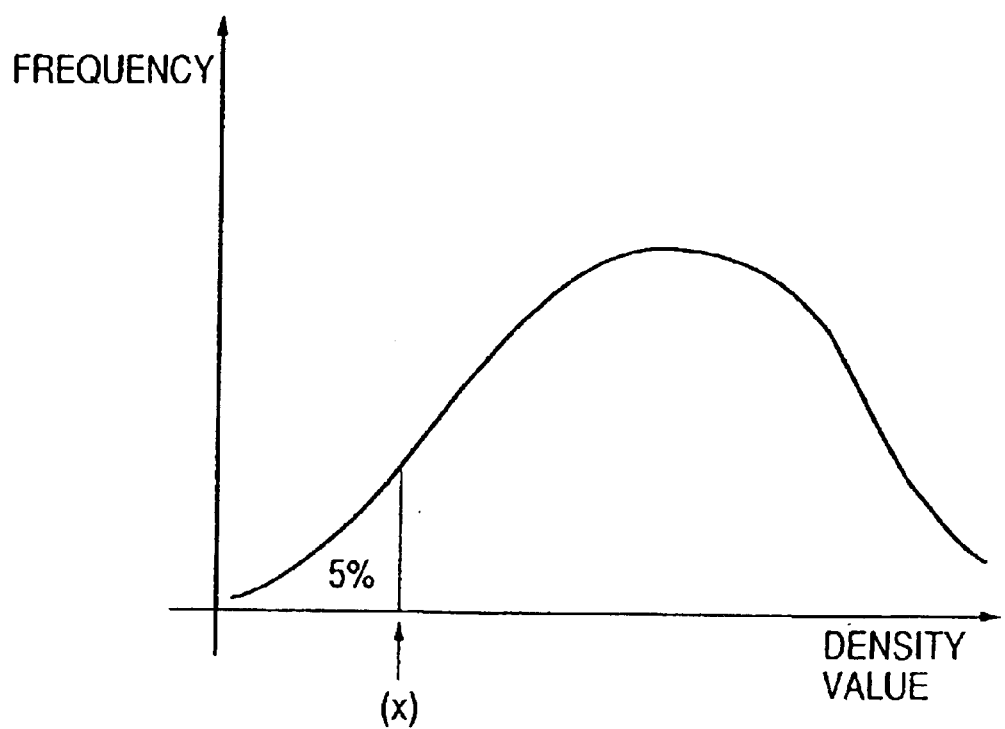
FIG. 28 shows a histogram for use in the conventional characteristic amount extracting method.

FIG. 26 is a flowchart showing a processing flow for judging based on the object outline shape whether the shoulder image photographed in the original image is a left site or a right site. Additionally, the same steps as those of FIG. 14 showing the processing of extracting the characteristic area of the shoulder image are denoted with the same reference numerals.

The maximum value in the entire shoulder image (FIG. 15) is calculated (S1201). The passing through area is extracted based on the calculated maximum value (S1202 of FIG. 16).

The pixel values are searched in the vertical direction from the upper side to the lower side of the image, and the border line on which the value of 0 changes to the value other than 0 is extracted as the outline (S1203 of FIG. 17). Here, any method of extracting the object outline may be used. For example, the method comprises calculating the differential value, the high-order differential difference value, or the high-order difference value for each vertical line in the irradiation area, and outlining the first peak value.

The tangent line vector on the outline is calculated in the direction from the left to the right of the image (e.g., direction between constant two points on the outline). Furthermore, the outer product value of the calculated tangent line vector is calculated. For example, in FIG. 18 the outer product value of point M is the outer product value (A×B) of vectors A, B of points A, B at equal distances from the point M on the outline (S1204 of FIG. 17).

The maximum value of the calculated outer product value is detected, and the coordinate indicating the maximum value on the outline is regarded as the coordinate with the highest curvature on the outline (point M, S1205). Subsequently, y coordinates y2, y3 of coordinates A, B of two points at equal distances from the point M on the outline are extracted (S1601). Then, when y3>y1 in the coordinate on y-axis (y1 is y coordinate of M), the left shoulder is judged. In the other cases, the right shoulder is judged (S1602, S1604, S1603).

The outline of the shoulder image has a peculiar inclination. By extracting the inclination, the object posture, that is, the left or the right can stably be judged.

As described above, each site has a characteristic in its shape. Therefore, by judging the posture from the relation between the site shape characteristic and the object outline, the object posture can stably be judged. Moreover, by extracting the passing through area based on the maximum value of the entire original image, the passing through area can stably be extracted. Therefore, by regarding the passing through area end portion as the object outline, the object outline can stably be extracted.

Additionally, needless to say, the object of the present invention can also be attained by supplying storage medium in which the program code of software for realizing the function of a host computer and terminals of the above-described embodiments is stored to the system or the device, and reading and executing the program code stored in the storage medium by the computer (or CPU or MPU) of the system or the device.

In this case, the program code itself read from the storage medium realizes the function of each embodiment, and the storage medium in which the program code is stored constitutes the present invention.

As the storage medium for supplying the program code, a ROM, a floppy disk, a hard disk, an optical disk, an optomagnetic disk, a CD-ROM, a CD-R, a magnetic tape, a non-volatile memory card, and the like can be used.

By executing the program code read by the computer, the function of the embodiment can be realized. Additionally, based on the instruction of the program code, an OS or the like operating on the computer performs a part or the whole of an actual processing, and needless to say, the function of the embodiment is realized by the processing.

Furthermore, after the program code read from the storage medium is written into a memory disposed on a function expansion board inserted into the computer or a function expansion unit connected to the computer, based on the instruction of the program code, a CPU or the like disposed on the function expansion board or the function expansion unit performs a part or the whole of the actual processing, and needless to say, by the processing the function of the embodiment is realized.

What is claimed is:

1. A method for processing a radiation image obtained by radiographing an object, comprising:

an analyzing step, of analyzing a shape of an outside outline of the object, and determining coordinates used for determining a characteristic value extracting area;

a setting step, of setting the characteristic value extracting area based on the coordinates; and a calculating step, of calculating a characteristic value from the characteristic value extracting area, wherein, in said setting step, curvatures at a plurality of points of the outline are calculated, and the coordinates used for determining the characteristic value extracting area is determined based on the curvatures.

2. The method according to claim 1, further comprising a recognizing step of recognizing an irradiation field area in the radiation image.

3. The method according to claim 1, wherein the object includes at least one of a cervical vertebra, a shoulder and a head.

4. The method according to claim 1, further comprising a conversion step of performing a gradation conversion of the radiation image based on the characteristic value.

5. The method according to claim 1, wherein the curvature at an object point is obtained by an outer product of tangent line vectors at points that sandwich the object point on the outline.

6. The method according to claim 1, wherein the object comprises a shoulder.

7. The method according to claim 1, further comprising a conversion step, of performing a gradation conversion of the radiation image based on the characteristic value.

8. A method according to claim 1, wherein the characteristic value is a statistic which shows any one of a maximum value, minimum value, mean value, and average value.

9. A method according to claim 1, further comprising a conversion step, of defining the shape of a gradation conversation curve so as to make the characteristic value into a fixed value.

10. A radiation image processing apparatus adapted to process a radiation image obtained by radiographing an object, comprising:

an analyzing unit for analyzing a shape of an outside outline of the object, and determining coordinates used for determining a characteristic value extracting area;

a setting unit for setting the characteristic value extracting area based on the coordinates; and a calculating unit for calculating a characteristic value from the characteristic value extracting area, wherein, in said setting unit, curvatures at a plurality of points of the outline are calculated, and the coordinates used for determining the characteristic value extracting area is determining based on the curvatures.

11. A storage medium for storing a program for making a computer execute a method for processing a radiation image obtained by radiographing an object, the method comprising:

an analyzing step, of analyzing a shape of an outside outline of the object, and determining coordinates used for determining a characteristic value extracting area;

a setting step, of setting the characteristic value extracting area based on the coordinates; and a calculating step, of calculating a characteristic value from the characteristic value extracting area, wherein, in said setting step, curvatures at a plurality of points of the outline are calculated, and the coordinates used for determining the characteristic value extracting area is determined based on the curvatures.

12. A method of processing a radiation image obtained by radiographing an object, said method comprising:

an outside outline extracting step, of extracting an outside outline of an area of the object;

an analyzing step, of analyzing a positional relation between a depression and a protrusion of the outside outline of the object; and judging a posture of the object based on the positional relation.

13. A method according to claim 12, wherein said outside outline extracting step comprises an object extracting step, of extracting an area of the object by deleting a direct irradiated area from the radiation image, and an outline extracting step, of extracting the outside outline of the object of an area of the object obtained in said object extracting step.

14. A method according to claim 12, wherein the image processing of an image of the object is changed in accordance with the judgment result of the posture.

15. A radiation image processing apparatus adapted to process a radiation image obtained by radiographing an object, comprising:

an outside outline extracting unit for extracting an outside outline of an area of the object; and an analyzing unit for calculating a curvature from a shape of the outside outline of the object, and judging a posture of the object based on the calculated result, wherein, in said analyzing unit, a positional relation between a depression and a protrusion of the outside outline of the object is analyzed and a posture of the object is judged based on the positional relation.

16. A storage medium for storing a program for making a computer execute a method for processing a radiation image obtained by radiographing an object, said method comprising:

an outside outline extracting step, of extracting an outside outline of an area of the object; and an analyzing step, of calculating a curvature from a shape of the outside outline of the object, and judging a posture of the object based on the calculated result, wherein, in said analyzing step, a positional relation between a depression and a protrusion of the outside outline of the object is analyzed and a posture of the object is judged based on the positional relation.

* * * * *

UNITED STATES PATENT AND TRADEMARK OFFICE
CERTIFICATE OF CORRECTION

PATENT NO. : 6,850,634 B1
DATED : February 1, 2005
INVENTOR(S) : Hiroyuki Shinbata It is certified that error appears in the above-identified patent and that said Letters Patent is hereby corrected as shown below:

Column 6,
Line 23, "a" should read -- as --.

Column 7,
Line 13, "terribly" should read -- widely --.

Column 9,
Line 67, "d'+" should read -- d'1+ --.

Column 11,
Line 62, "These circuit" should read -- These circuits --.

Column 14,
Line 61, "value x2" should read -- value x4 --.

Column 17,
Line 41, "storage" should read -- a storage --.

Column 18,
Line 59, "determining" should read -- determined --.

Signed and Sealed this

Thirtieth Day of August, 2005

JON W. DUDAS
*Director of the United States Patent and Trademark Office*